(12) United States Patent
Ricotta

(10) Patent No.: US 9,982,516 B2
(45) Date of Patent: May 29, 2018

(54) SYSTEM AND METHOD FOR OIL AND CONDENSATE PROCESSING

(71) Applicant: KATA Systems LLC, Golden, CO (US)

(72) Inventor: Joseph A. Ricotta, Golden, CO (US)

(73) Assignee: KATA SYSTEMS LLC, Golden, CO (US)

( * ) Notice: Subject to any disclaimer, the term of this patent is extended or adjusted under 35 U.S.C. 154(b) by 178 days.

(21) Appl. No.: 14/717,670

(22) Filed: May 20, 2015

(65) Prior Publication Data

US 2015/0337218 A1    Nov. 26, 2015

Related U.S. Application Data

(60) Provisional application No. 62/000,728, filed on May 20, 2014.

(51) Int. Cl.
| | |
|---|---|
| *E21B 43/00* | (2006.01) |
| *B01D 17/02* | (2006.01) |
| *C10G 7/06* | (2006.01) |
| *C10G 7/02* | (2006.01) |
| *C10L 3/10* | (2006.01) |
| *C10G 33/06* | (2006.01) |
| *C10G 53/02* | (2006.01) |
| *C10G 7/04* | (2006.01) |
| *B01D 53/00* | (2006.01) |
| *B01D 53/26* | (2006.01) |

(52) U.S. Cl.
CPC .......... *E21B 43/00* (2013.01); *B01D 17/0214* (2013.01); *B01D 53/002* (2013.01); *C10G 7/02* (2013.01); *C10G 7/04* (2013.01); *C10G 7/06* (2013.01); *C10G 33/06* (2013.01); *C10G 53/02* (2013.01); *C10L 3/10* (2013.01); *C10L 3/106* (2013.01); *B01D 53/265* (2013.01); *B01D 2256/245* (2013.01); *B01D 2257/702* (2013.01); *B01D 2257/80* (2013.01); *C10L 2290/46* (2013.01); *C10L 2290/48* (2013.01); *C10L 2290/543* (2013.01); *C10L 2290/545* (2013.01)

(58) Field of Classification Search
CPC .. B01D 17/0214; B01D 19/0036; E21B 43/00
See application file for complete search history.

(56) References Cited

U.S. PATENT DOCUMENTS

| | | | |
|---|---|---|---|
| 4,124,496 A | * 11/1978 | Cummings | ............ B01D 3/065 208/351 |
| 8,992,838 B1 | 3/2015 | Mueller | |
| 2013/0213085 A1 | 8/2013 | Ward | |

* cited by examiner

*Primary Examiner* — Renee Robinson
(74) *Attorney, Agent, or Firm* — Sheridan Ross PC

(57) ABSTRACT

A system and method for the on-site separating and treating of a hydrocarbon liquid stream at an oil and gas production site is disclosed. The system comprises an oil and condensate distillation unit and a vapor recovery unit. In one embodiment, the oil and condensate distillation unit operates at low pressure or vacuum conditions to reduce the vapor pressure above the column of oil within the tubing, thereby increasing the production of oil and condensate and capturing entrained natural gas otherwise lost or burned off. The system further functions to improve the quality and volume of recovered natural gas and to decrease air pollution, in addition to increasing oil and condensate production at the well site.

20 Claims, 27 Drawing Sheets

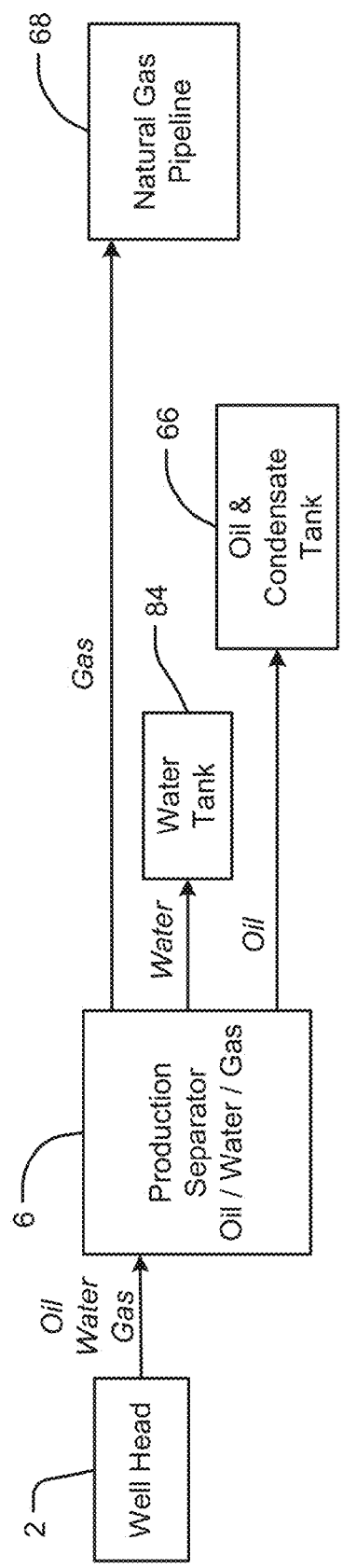
FIG. 1: Prior Art

Volatile Organic Compound Emission Calculation for Flashing

Vasquez – Beggs Solution Gas/Oil Ratio Correlation Method (For Estimating VOC Flashing Emissions, Using Stock Tank Gas-Oil Ratios)

INPUTS:

| | |
|---|---|
| Stock Tank API Gravity | 30 |
| Distillation Column Pressure (psia) | -5.0 |
| Distillation Column Temperature (°F) | 250 |
| Distillation Column Gas Gravity at Initial Conditions | 0.9 |
| Barrels of Oil per day (BOPD) | 1000 |
| Gas Molecular Weight | 40 |
| Fraction VOC (C3+) of Stock Tank Gas | 0.8 |
| Atmospheric Pressure (psia) | 13.1 |

$SG_x$ = Dissolved gas gravity at 100 psia = $SG$ [1.0 + 0.00005912 × API × T × Log(P/114.7)]

$Rs = (C1 * SGx * Pi^\wedge C2) \exp((C3 * API) / (Ti + 460))$

WHERE:
| Rs | GAS/OIL RATIO OF LIQUID AT PRESSURE OF INTEREST |
|---|---|
| SGx | DISSOLVED GAS GRAVITY AT 100 PSIG |
| Pi | PRESSURE OF INITIAL CONDITION (PSIA) |
| API | API GRAVITY OF LIQUID HYDROCARBON AT FINAL CONDITION |
| Ti | TEMPERATURE OF INITIAL CONDITION (F) |

CONSTANTS

| | °API GRAVITY | | |
|---|---|---|---|
| °APTI→ | < 30 | >= 30 | GIVEN °API |
| C1 | ~~0.0362~~ | 0.0178 | 0.0178 |
| C2 | ~~1.0937~~ | 1.187 | 1.187 |
| C3 | ~~25.724~~ | 23.931 | 23.931 |

| Rs = | 0.27 | scf/bbl | FOR P + Patm = | 8.5 |

$THC = Rs * Q * MW * 1/385 \text{ scf/lb-mole} * 365 \text{ D/YR} * 1 \text{ TON}/2000 \text{ lb.s}$

| THC | TOTAL HYDROCARBON (TONS/YEAR) |
|---|---|
| Rs | SOLUTION GAS/OIL RATIO (scf/STB) |
| Q | OIL PRODUCTION RATE (bbl/day) |
| MW | MOLECULAR WEIGHT OF STOCK TANK GAS (lb/lb-mole) |
| 385 | VOLUME OF 1 lb-mole OF GAS AT 14.7 PSIA AND 68 F (WAQS&R STD COND) |

| THC = | 6.3 | TPY |

VOC = THC * FRAC. OF C3+ IN THE STOCK TANK VAPOR

| VOC | 5.06 | TPY | FROM "FLASHING" OF OIL FROM DISTILLATION COLUMN TO TRANK PRESS |

FIG.8B

REDUCTION OF VOC FLASH BELOW 6TPY

| Oil Flow | Vacuum as PSI (VOC Flashed as TPY) | | |
|---|---|---|---|
| bbl/day | Min | Optimal | Max |
| 100 | ATM(1.6) | -1.8(1.3) | -3.6(<1.0) |
| 500 | -2.5(5.9) | -7.5(2.1) | -9.4(<1.0) |
| 1000 | -6.1(5.9) | -9.1(2.8) | -10.4(<1.0) |
| 1500 | -7.7(5.8) | -9.8(2.3) | -10.8(<1.0) |
| 2000 | -8.5(5.8) | -10.3(2.2) | -11.0(<1.0) |
| 2500 | -9.0(5.8) | -10.5(2.2) | -11.2(<1.0) |

*Table 1: Reduction of VOC Flash below 6 TPY*

Figure 10

REDUCTION OF VOC FLASH BY 95%

| Oil Flow | Vacuum as PSI (VOC Flashed as TPY) | | | Potential to Emit based on (250psi Sep) | | |
|---|---|---|---|---|---|---|
| bbl/day | Min 98% | Optimal 98.7 | Max 99% | Potential Emissions | 95% Target | 98% Target |
| 100 | ATM(1.6) | -1.8(1.3) | -3.6(0.9) | 101 | 5.05 | 1.01 |
| 500 | ATM(8.1) | -1.8(6.5) | -3.6(4.9) | 505 | 25.25 | 5.05 |
| 1000 | ATM(16.2) | -1.8(12.9) | -3.6(9.9) | 1,011 | 50.55 | 10.11 |
| 1500 | ATM(24.3) | -1.8(19.6) | -3.5(15.1) | 1,517 | 75.85 | 15.17 |
| 2000 | ATM(32.4) | -1.8(25.2) | -3.5(20.1) | 2,022 | 101.1 | 20.22 |
| 2500 | ATM(40.5) | -1.8(32.4) | -3.5(25.1) | 2,528 | 126.4 | 25.28 |

*Table 2: Reduction of VOC Flash by 95%*

Figure 11

Assumptions for Tables 1 and 2:
- Stock Tank API Gravity: 36 API
- Distillation Column Pressure: Varies (ATM to -12PSI)
- Distillation Column Temperature: 150F Embodiment A, 170F Embodiment B, 250F Embodiment C
- Distillation Column Gas Gravity: 0.9 SGI
- Barrels Oil/Day: Varies from 100-2500 Q
- Gas Molecular Weight: 49 MW
- Fraction VOC of Tank Gas: 0.8 VOC
- Atmospheric Pressure: 12.1 Patm (assuming average Colorado plains elevation)

*VOC Flashed as TPY: The remaining not captured "flash vapor," measured in tons per year, from oil in tanks after dropping the oil pressure in the distillation column to within the indicated ranges.

Figure 12

CAPTURE GAIN OVER PRIOR ART "WARD"
Assuming 1,000 bbl/day production site.

| Technology | Processing pressure PSI | 150F | 250F | Capture % @ 150F | Capture % @ 250F |
|---|---|---|---|---|---|
| "Ward" | Min Pressure | 35 | 103.7 | 77.02 | 89.7% | 92.4% |
| | Max Pressure | 125 | 430.9 | 358.9 | 57.4% | 64.5% |
| Proposed | Max Vacuum | -3.6 | 9.9 | 5.1 | 99.0% | 99.5% |
| Invention | Min Vacuum | ATM | 16.2 | 9.3 | 98.4% | 99.1% |

Total Efficiency Gains:  Min    9.3%    7.1% Gain over Prior Art
                         Max   41.0%   34.6% Gain over Prior Art
                              Embd. A  Embd. C Remaining VOCs in Tanks = The Natural gas vapors not captured by the technology to be flashed off at tanks.
Capture % = Remaining VOCs in Tanks / Potential VOC Emmisions)
Potential Emmisions = VOCs sent to tanks under normal separator pressure and temp without vapor recovery technology.
        Potential VOC Emmisions 150F, 250PSI, 1,000bbl/day        1,811 tons per year

*Table 3: Entrained Gas Capture Gain over Prior Art of Ward*

Figure 13

| Tubing Pressure (PSI) | Sales Line Pressure (PSI) | | | | | | | |
|---|---|---|---|---|---|---|---|---|
| | 5 | 10 | 15 | 30 | 50 | 100 | 150 | 300 |
| 250 | x | x | x | x | x | x | x | 29 |
| 200 | x | x | x | x | x | x | x | 36 |
| 150 | x | x | x | x | x | x | x | 46 |
| 100 | x | x | x | x | x | x | 35 | 66 |
| 50 | x | x | x | x | x | 43 | 62 | 115 |
| 25 | x | x | x | 28 | 40 | 70 | 100 | 147 |
| 1 | 31 | 38 | 46 | 69 | 100 | 141 | 169 | 216 |
| 0 (ATM) | 33 | 41 | 49 | 66 | 107 | 146 | 175 | 222 |
| -3 | 41 | 51 | 62 | 93 | 123 | 164 | 193 | 240 |
| -4 | 45 | 56 | 67 | 101 | 129 | 171 | 199 | 246 |
| -5 | 50 | 62 | 74 | 112 | 135 | 180 | 206 | 255 |
| -10 | 102 | 120 | 131 | 161 | 194 | 231 | 261 | 325 |
| -14.7 | 243 | 262 | 279 | 319 | 361 | 437 | 493 | 612 |

Brake Horsepower = 22 * (ratio/stage) * (Number of Stages) * (MMSCFD) * (F)
where F = 1.0 for a single stage, 1.08 for a two-stage and 1.1 for a three-stage.
Gas Processors Suppliers Association Engineering Data Book Eleventh Edition, FPS Version, 1998, eq 13-4
eq 13-4 developed for large slow speed (300-450 RPM) compressors with SG = 0.65 and having CR > 2.50
Assuming a site producing 1.0 MMCFD (1,000,000 cubic feet) of Natural Gas per day, 24hr compressor run.

Figure 14

*Table 4: Horsepower Requirement - Vapor Recovery and or Sales Compressor*

Table 5: Fuel Gas Consumption - Vapor Recovery and or Sales Compressor

Table 6: Horse Power Requirements - Oil Pump

Oil Production (bbl/day)

| Power (hp) | Fuel Gas (cfd) |
|---|---|
| 100 | 27 | 6,550 |
| 250 | 68 | 16,374 |
| 500 | 136 | 32,749 |
| 1000 | 273 | 65,497 |
| 1500 | 409 | 98,246 |
| 2000 | 546 | 130,994 |

Horse Power = (Crude Oil bbl/day x 42 gal/bbl x Max Pressure / CF) / (eff x SG)
Fuel Gas (cfd) = Horse Power x 10 CFH per Horsepower)

42 gal/bbl
5 psi
1710 CF
0.5 eff
0.9 SG

Assume 24hr running pumps

Table 7: Horse Power Requirements - Water Pump

Water Production (bbl/day)

| Power (hp) | Fuel Gas (cfd) |
|---|---|
| 1 | 0.2 | 59 |
| 3 | 0.8 | 196 |
| 5 | 1.4 | 327 |
| 10 | 2.7 | 655 |
| 15 | 4.1 | 982 |
| 20 | 5.5 | 1,310 |

42 gal/bbl
5 psi
1710 CF
0.5 eff
1 SG

Figure 16

| Oil Production (bbl/day) | Horse Power (hp) per Subsystem | | | |
|---|---|---|---|---|
| | Compressor | Oil Pump | Water Pump | Total hp Required |
| 100 | 222 | 27 | 0.2 | 250 |
| 250 | No Data | 68 | 0.8 | 69 |
| 500 | No Data | 136 | 1.4 | 138 |
| 1000 | No Data | 273 | 2.7 | 276 |
| 1500 | No Data | 409 | 4.1 | 413 |
| 2000 | No Data | 546 | 5.5 | 551 |

*1 MMCFD Nat Gas Production, ATM Distillation Column, 300psi Dsch Press
Total hp Required = Compressor hp + Oil Pump hp + Water Pump hp
Assume 24hr running of equipment

Table 8: Total Horsepower Required - Oil Distillation Unit (Compressor/Oil Pump/Water Pump)

Figure 17

| Oil Production (bbl/day) | Total Fuel Gas Required per Subsystem | | | Tot Fuel As BTUs | Tot Fuel As Rtv (bbl oil)* | Rtv 10hr/day (bbl oil) |
|---|---|---|---|---|---|---|
| | Compressor/Oil Pump | Water Pump | Total SCFD | | | |
| 100 | 53,280 | 59 | 53,889 | 5.99E+07 | 10.3 | 4.3 |
| 250 | No Data | 196 | 16,571 | 1.66E+07 | 2.9 | |
| 500 | No Data | 327 | 33,076 | 3.31E+07 | 5.7 | |
| 1000 | No Data | 655 | 66,152 | 6.62E+07 | 11.4 | |
| 1500 | No Data | 982 | 99,228 | 9.92E+07 | 17.1 | |
| 2000 | No Data | 1,310 | 132,304 | 1.32E+08 | 22.8 | |

Assume 1 MMCFD Nat Gas Production, ATM Distillation Column, 300psi Dsch Press
Total SCFD = Compressor SCFD + Oil Pump SCFD + Water Pump SCFD
BTUs Fuel = Total SCFD x BTU/CF of Natural Gas
Rtv bbl oil = (BTUs Fuel) / (BTU/bbl of oil)
5,800,000 BTU/bbl of oil
1,000 BTU/CF of Natural Gas

Figure 18

Table 9: Total Fuel Gas Required - Oil Processing Unit (Compressor/Oil Pump/Water Pump)

| | Volume of Oil Column (Head) as bbl/lift or bbl/day | | |
|---|---|---|---|
| | Oil Volume | Eff factor | Gross Production Increase |
| 1 Lift | 14.9 ft^3 | 30% | |
| | 111.7 gal | | |
| | 2.7 bbl | | 1.04 |
| **10 Lifts | 26.6 bbl | | 8.0 bbl/day or 4% increase in production |

Oil Volume = (Psales-gas x pi x r^2) / (rho x g)
Production Increase = (Production bbl/day + Oil Volume Increase (10 bbl) - Relative to bbl oil)

| | | |
|---|---|---|
| rho | 7.076 | API 35 Oil |
| g | 32.17 | ft/s^2 |
| Psales-gas | 300 | psi |
| Rpipe | 1.9 | in |
| Pie | 3.14 | |
| CF | 7.48 | gal/ft^3 |
| CF | 42 | gal/bbl |
| Plunger Lifts | 10 per day - Assuming typical plunger lift cycles to surface** | |
| Production | 100 bbl/day | |

Table 10: Increasing Oil Column Head After Reduction of Vapor Pressure Above Oil Column

Figure 19

SYSTEM AND METHOD FOR OIL AND CONDENSATE PROCESSING

CROSS REFERENCE TO RELATED APPLICATIONS

This application claims priority to and the benefit of U.S. Provisional Patent Application No. 62/000,728 entitled "System and Method for Oil and Condensate Processing" filed on May 20, 2014, the entire disclosure of which is incorporated by reference herein.

FIELD

Embodiments of the present invention are generally related to a system and method for oil and condensate on-site processing at an oil and gas production site and in particular, to a system and method for on-site processing of oil and condensate at low pressure or at a vacuum.

BACKGROUND

At a typical oil and gas production site, a crude mixture from a well is brought to the surface and then separated into oil, gas and water in a three phase separator vessel. After separation, normally the oil goes to an oil storage tank, the water to a water tank and the natural gas to a natural gas pipeline.

Conventional separation systems leave a significant amount of natural gas entrained in the oil which flash vaporizes in the oil storage tanks. The natural gas that flash vaporizes in the storage tanks is contaminated by ambient air which decreases its economic value. This low value natural gas that has been contaminated is typically burned off at a combustion flare or vented directly to the atmosphere. Direct tank venting, fugitive emissions (gas leaks) from tanks, and exhaust from combustion flares significantly increases air pollution and greenhouse gasses, and wastes natural gas that could be recovered and sold.

Conventional approaches to processing hydrocarbon mixtures are inefficient at recovery of natural gas vapors and burn-off significant quantities of natural gas vapors. Some efforts have been made to reduce the burn-off or combustion flaring of natural gas vapors, such as US Pat. Publ. No. 2013/0213085 to Ward ("Ward"). Ward discloses systems and methods for processing a hydrocarbon mixture wherein heat is generated from compression of recovered natural gas vapors and used to provide a heating medium for a heat exchanger. While some recovery efficiencies are realized through Ward's application of heat, the improvements are modest and not as effective as the method and system disclosed in which oil and condensate are processed on-site at low pressure or in a vacuum. Ward is incorporated by reference in its entirety. Ward is incorporated herein by reference in its entirety.

U.S. Pat. No. 8,992,838 to Mueller ("Mueller") discloses a method and system to reduce oxygen from flash vapor captured from storage tanks wherein the flash vapor is compressed and then refined in an oxygen reduction subsystem and sent to a sales line. While some oxygen is removed through Mueller's application of his subsystem, the effectiveness is modest in that oxygen is not entirely removed from the gas stream. In addition to modest oxygen reduction, byproducts are generated such as $CO_2$ and $H_2O$ which are not economically viable products while the former is a greenhouse gas and the latter promotes corrosion in gas sales pipelines. In addition to byproducts, Mueller's system and method realizes poor efficiency due to $H_2S$ contamination which damages the catalyst bed. The method and system herein processes oil and condensate prior to storage tanks eliminating oxygen contamination by ambient air and eliminating the need for a specialized catalyst that can be damaged by $H_2S$. Mueller is incorporated herein by reference in its entirety.

A system and method for oil and condensate on-site processing at an oil and gas production site is disclosed. The system comprises an oil and condensate distillation unit and a vapor recovery unit. In one embodiment, the oil and condensate distillation unit operates at low pressure or vacuum conditions to reduce the vapor pressure above the column of oil within the tubing, thereby increasing the production of oil and condensate and capturing entrained natural gas otherwise lost or burned off. Benefits include improved quality and volume of recovered natural gas and decreased air pollution, in addition to increased oil and condensate production at the well site.

SUMMARY

A system and method for oil and condensate processing at an oil and gas production site that improves oil production rates and the capture of entrained natural gas otherwise lost in a conventional system is disclosed. The system and method works within the typical framework of an oil and gas production site, and is designed to be installed between a conventional three phase separator and oil storage tanks or, in some embodiments, as a replacement for or in conjunction with a 3-phase separator. By installing system prior to the oil storage tanks oil and condensation production rates may be improved, and any natural gas contamination by ambient air is completely eliminated, improving the quality and volume of natural gas entering the sales pipeline and decreasing air pollution.

In one embodiment, a method of processing a produced oil and natural gas mixture from a well head at an on-site production facility is disclosed, the method comprising: receiving the produced oil and natural gas mixture comprising oil, water, and natural gas from the well head at a first pressure; reducing the oil, natural gas, and water mixture to a second pressure; separating the water from the oil and natural gas; separating the oil and natural gas mixture into natural gas and a stream of oil; and distilling the natural gas to separate natural gas condensate from the natural gas.

In another embodiment, a system for processing a produced hydrocarbon fluid from a wellbore comprising a first stream including oil, natural gas and water at an on-site production facility to eliminate flaring is disclosed, the system comprising: a separator to separate the oil, natural gas and water in the first stream at a first pressure; a distillation unit configured to receive the oil at a first pressure and reduce the pressure to a second pressure which is less than the first pressure, the distillation unit operating at a range between atmospheric pressure and −14 psig and further configured to separate natural gas from the oil; and a vapor recovery unit configured to receive the separated natural gas and scrub the separated natural gas to remove condensate liquid.

In yet another embodiment, a method of processing a produced well stream comprising natural gas, water and an oil/condensate mixture from a wellbore at an on-site production facility to substantially reduce energy loss is disclosed, the method comprising: receiving the produced well stream at a first pressure; separating the water, natural gas and oil with a three phase separator; reducing the pressure of the oil to a second pressure, the second pressure lower than the first pressure and at or below atmospheric pressure; separating the oil stream to flash natural gas; distilling the natural gas to form natural gas condensate and natural gas vapors; scrubbing the distilled natural gas vapors to remove excess liquids; wherein the wellhead pressure is controlled downstream of the three phase separator.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As used herein, the term "ATM" means a standard atmosphere of pressure, aka standard atmospheric pressure, while the term "vacuum" means a pressure less than ATM.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A communication channel is used to convey an information signal, for example a digital bit stream, from one or several senders (or transmitters) to one or several receivers. A communication channel has a certain capacity for transmitting information, often measured by its bandwidth in Hz or its data rate in bits per second. Communication channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, Eb/No, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "display" refers to a portion of a screen used to display the output of a computer to a user.

The terms "determine", "calculate" and "compute," and variations thereof, as used herein, are used interchangeably and include any type of methodology, process, mathematical operation or technique.

The term "light ends" means one or more of the volatile products of a hydrocarbon, comprising methane, ethane, propane, butane, pentane, hexane, heptanes, octane and gasoline.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

This Summary is neither intended nor should it be construed as being representative of the full extent and scope of the present disclosure. The present disclosure is set forth in various levels of detail in the Summary as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

FIG. 8 provides details regarding volatile organic compound emission calculations as used to generate data contained in Tables 1-3 of FIGS. 10-13;

FIG. 10 provides Table 1 which describes the reduction of volatile organic compounds (VOC) flash below 6 tons per year (TPY);

FIG. 11 includes Table 2 which illustrates the reduction of VOC flash by 95%;

FIG. 12 provides assumptions associated with Tables 1-2 of FIGS. 10-11;

FIG. 13 includes Table 3 and provides the entrained gas capture gain over the cited prior art of Ward;

FIG. 14 provides Table 4 which describes horsepower requirements regarding vapor recovery and/or sales compressor;

FIG. 16 provides Table 6 related to horsepower requirements regarding an oil pump and Table 7 which describes horsepower requirements regarding a water pump;

FIG. 17 provides total horsepower required regarding an oil distillation unit (i.e. compressor/oil pump/water pump) in Table 8;

FIG. 18 provides Table 9 which describes total fuel gas required regarding an oil processing unit (i.e. compressor/oil pump/water pump); and FIG. 19 includes Table 10 related to increasing oil column head after reduction of vapor pressure above the oil column.

Figure 2A:
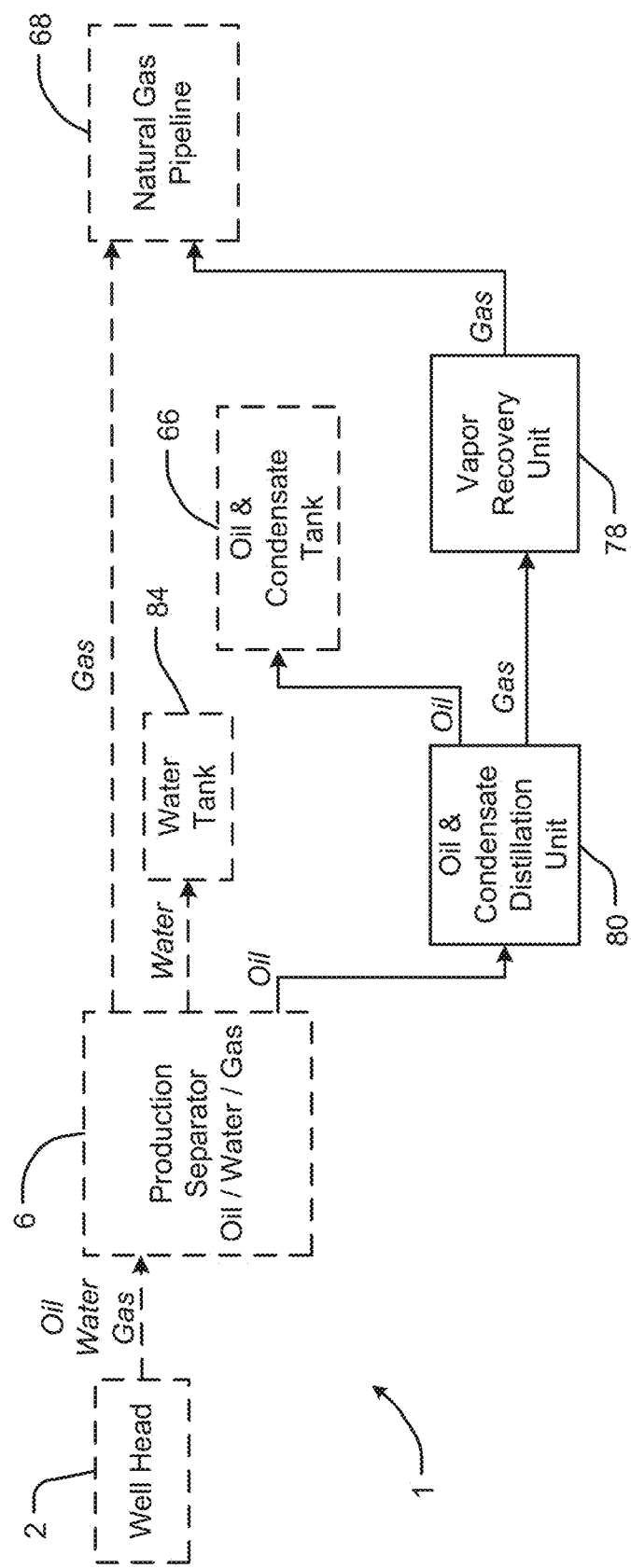
FIG. 2A depicts a flow diagram of an oil and condensate processing system according to one embodiment of the present invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 1 | Oil and condensate processing system |
| 2 | Gas well head |
| 6 | Production (three-phase) separator |
| 7 | Separator |
| 8 | Control valve |
| 10 | Combined separator and distillation unit |
| 12 | Control valve |
| 14 | Heat exchanger |
| 16 | Heat exchanger |
| 18 | Temperature instrument |
| 20 | Heat exchanger |
| 24 | Oil pump |
| 26 | Control valve |
| 30 | Control valve |
| 32 | Conduit |
| 36 | Inlet suction scrubber |
| 38 | Compressor |
| 40 | Forced draft cooler |
| 42 | Forced draft cooler |
| 44 | Discharge scrubber |
| 48 | Sales line compressor |
| 50 | Distillation column |
| 52 | Conduit |
| 54 | Combustion flare |
| 66 | Oil and condensate (storage) tank |
| 68 | Natural gas pipeline |
| 74 | Oil pump driver |
| 76 | Programmable logic controllers |
| 78 | Vapor recovery unit |
| 80 | Oil and condensate distillation unit |
| 82 | Sales valve |
| 84 | Water storage tank |
| 86 | Control valve |
| 88 | Control valve |
| 90 | Engine water coolant auxiliary pump |
| 92 | Conduit |
| 94 | Level instrument |
| 96 | Pressure instrument |
| 98 | Oil gathering pipeline |
| 100 | Conduit |
| 102 | Conduit |
| 104 | Conduit |
| 106 | Conduit |
| 108 | Conduit |
| 110 | Conduit |
| 112 | Control valve |
| 114 | Control valve |
| 116 | Control valve |
| 118 | Control valve |
| 120 | Valve |
| 122 | Pneumatic level float |
| 124 | Valve |
| 126 | Valve |
| 128 | Valve |
| 130 | Valve |
| 132 | Valve |
| 134 | Conduit |
| 136 | Relief valve |
| 140 | Relief valve |
| 142 | Programmable logic controller |
| 144 | Control valve |
| 146 | Control valve |
| 148 | Control valve |
| 150 | Conduit |
| 152 | Conduit |
| 154 | Relief valve |
| 156 | Valve |
| 214 | Conduit |
| 216 | Water Pump |
| 218 | Control valve |
| 220 | Conduit |
| 222 | Driver |
| 224 | Pneumatic LVL Float/Instrument |
| 226 | Conduit |
| 228 | Conduit |
| 230 | Control Valve |

DETAILED DESCRIPTION

Figures 1, 3A:
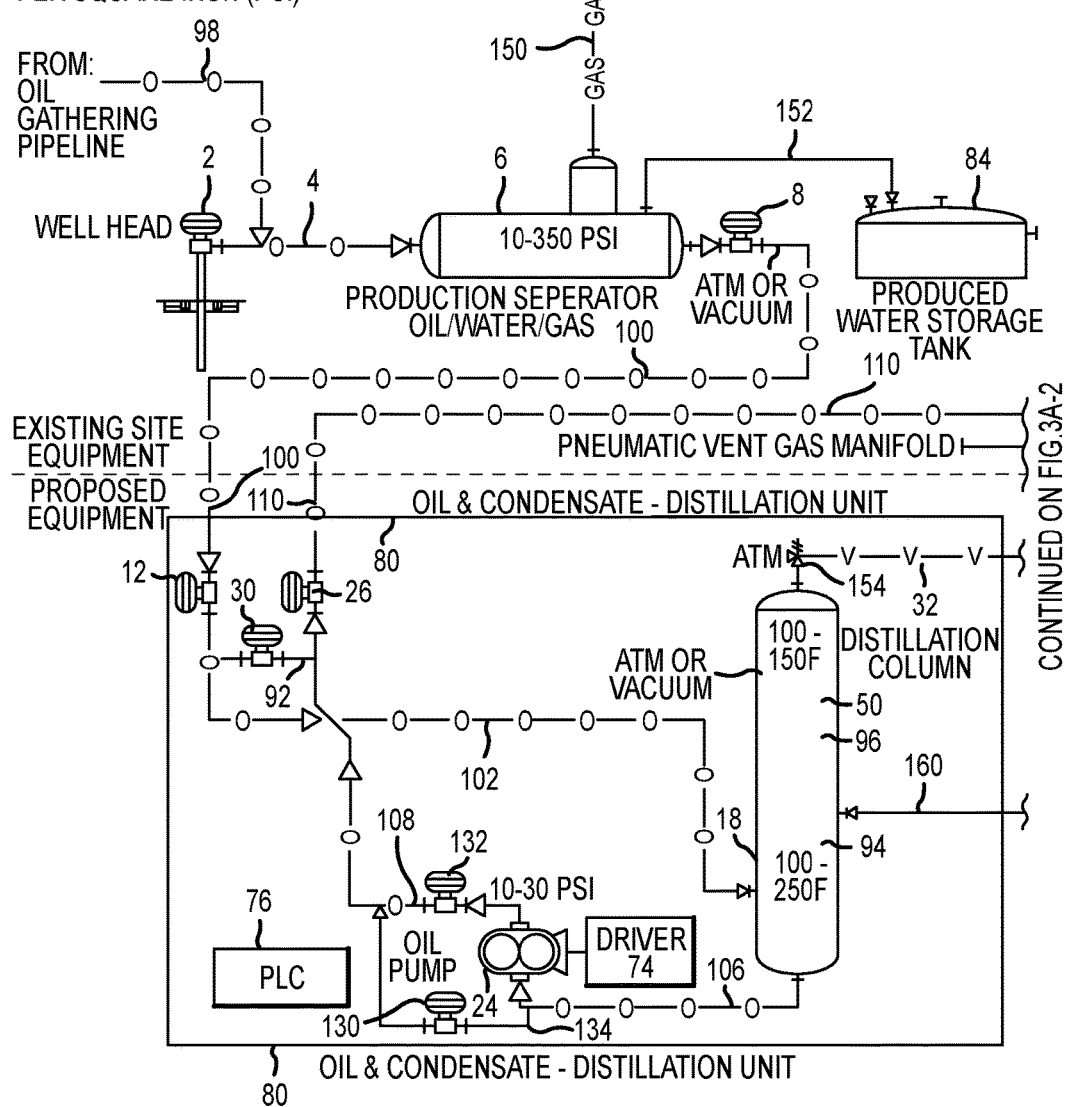
FIG. 1 depicts a flow diagram of a conventional oil and condensate processing system according to the prior art.
FIG. 3A depicts a more detailed flow diagram of an oil and condensate processing system in accordance with the embodiment of FIG. 2A.

FIG. 1 depicts a flow diagram of a conventional oil and condensate processing system according to the prior art. Generally, a mixture of oil, water and natural gas, as recovered from a well head 2, are received by a production separator (a.k.a. "three-phase separator") 6. The production separator 6 outputs oil to oil and a condensate tank 66, water to a water tank 84, and natural gas to a natural gas pipeline 68.

FIG. 2A depicts a flow diagram of an on-site oil and condensate processing system 1 at an oil and gas production site according to one embodiment of the present invention. After leaving the three-phase separator 6, but before the oil goes to the storage tank 66, it enters the distillation column 50 of oil and the condensate distillation unit 80 where the pressure is reduced to atmospheric or vacuum conditions. The unique step of bringing the oil to a very low or slightly negative pressure allows all the remaining natural gas entrained in the oil to "flash vaporize" within the distillation column 50. Once liberated the natural gas flash vapors rise and exit the distillation column 50. The natural gas flash vapors exiting the distillation column 50 flow to the natural gas sales line 68 while the oil flows from the distillation column 50 to the storage tank 66 now free of any remaining natural gas vapor. This method eliminates direct venting, fugitive emissions (gas leaks) from storage tanks, and the need to burn flash vapors at combustion flares, while delivering valuable natural gas to the sales pipeline that is wasted at a conventional oil and gas production site.

Figure 2B:
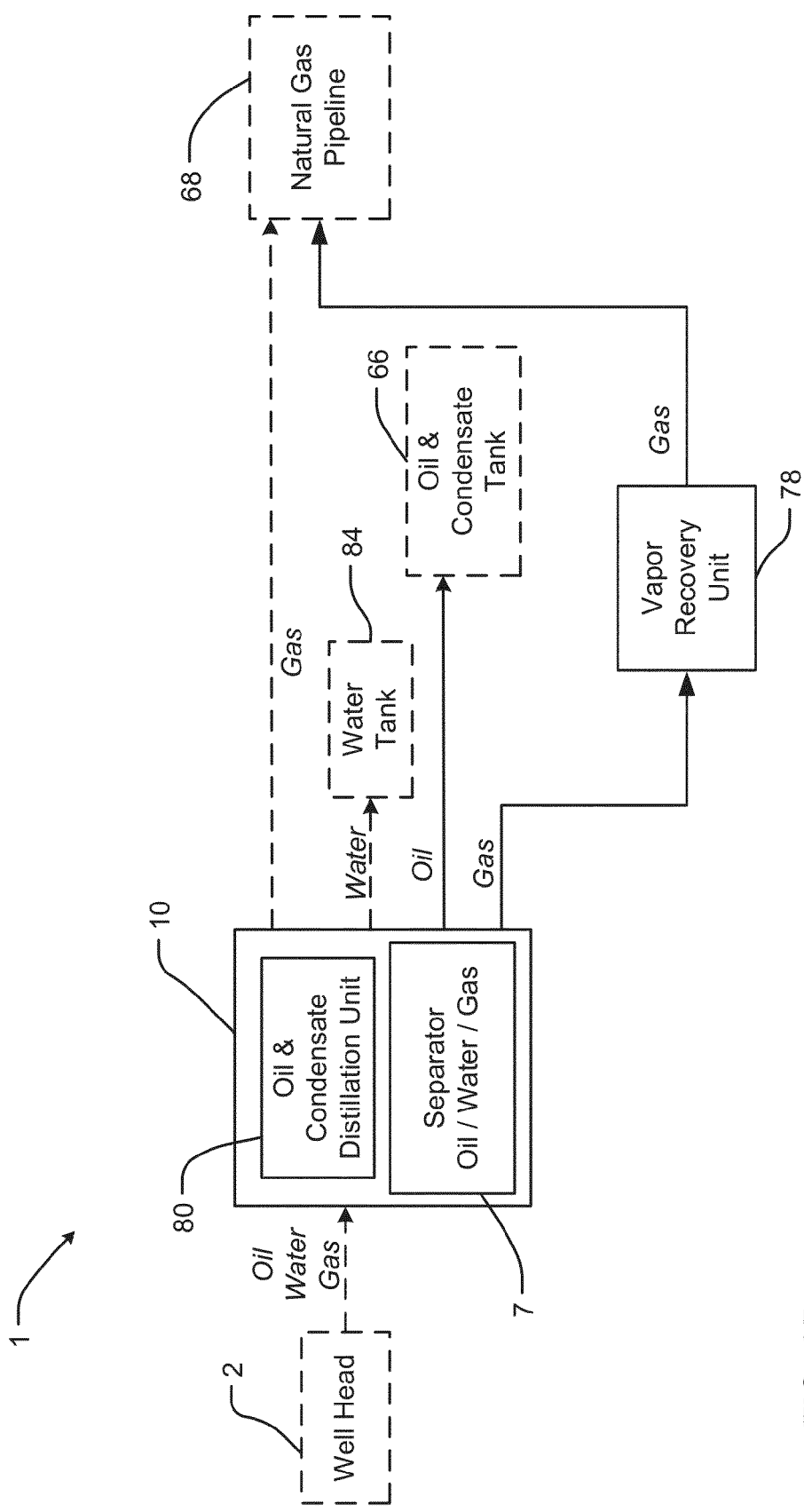
FIG. 2B depicts a flow diagram of an oil and condensate processing system according to another embodiment of the present invention.

FIG. 2B depicts a flow diagram of an on-site oil and condensate processing system 1 at an oil and gas production site according to one embodiment of the present invention. After leaving the well head 2, but before going to the oil tank 66, it enters the distillation column 50 of oil and condensate distillation unit 80 where the pressure is reduced to atmospheric or vacuum conditions, and oil, water, and natural gas are separated. The unique step of reducing the vapor pressure above the column of oil increases oil and condensate production, by increasing plunger lift rates and allows all the remaining natural gas entrained in the oil to "flash vaporize" within the distillation column 50. Once liberated the natural gas flash vapors rise and exit the distillation column 50. The natural gas flash vapors exiting the distillation column 50 flow to the natural gas sales line 68 while the oil flows from the distillation column 50 to the storage tank 66 now free of any remaining natural gas vapor, with separated water flowing to water tank 84. This method eliminates direct venting, fugitive emissions (gas leaks) from storage tanks, and the need to burn flash vapors at combustion flares, while increasing oil and condensate production rates and delivering valuable natural gas to the sales pipeline that is wasted at a conventional oil and gas production site.

FIG. 3A depicts a more detailed flow diagram of an oil and condensate processing system 1 in accordance with the embodiment of FIG. 2A. The system 1 generally includes an oil and gas well head 2 or oil gathering pipeline 98, a production separator 6, a produced water storage tank 84, an oil and condensate distillation unit 80, a vapor recovery unit 78, a sales line compressor 48, oil and condensate storage tank(s) 66, and a combustion flare 54.

An oil and condensate mixture that includes oil, condensate, water and natural gas is transmitted from an oil and condensate source to a production separator 6 of the type known in the art for initial separation of the hydrocarbon mixture. The production separator 6 removes natural gas from the hydrocarbon mixture and transmits the removed natural gas through a conduit 150 and through a sales valve 82 to a sales line compressor 48 or natural gas pipeline. Water is removed from the hydrocarbon mixture by the separator 6 through a conduit 152 to produced water tank storage tanks 84. Oil and condensate are transmitted from the separator 6 through a control valve 8 through conduit 100 to the oil and condensate distillation unit 80.

Figures 2, 3A:
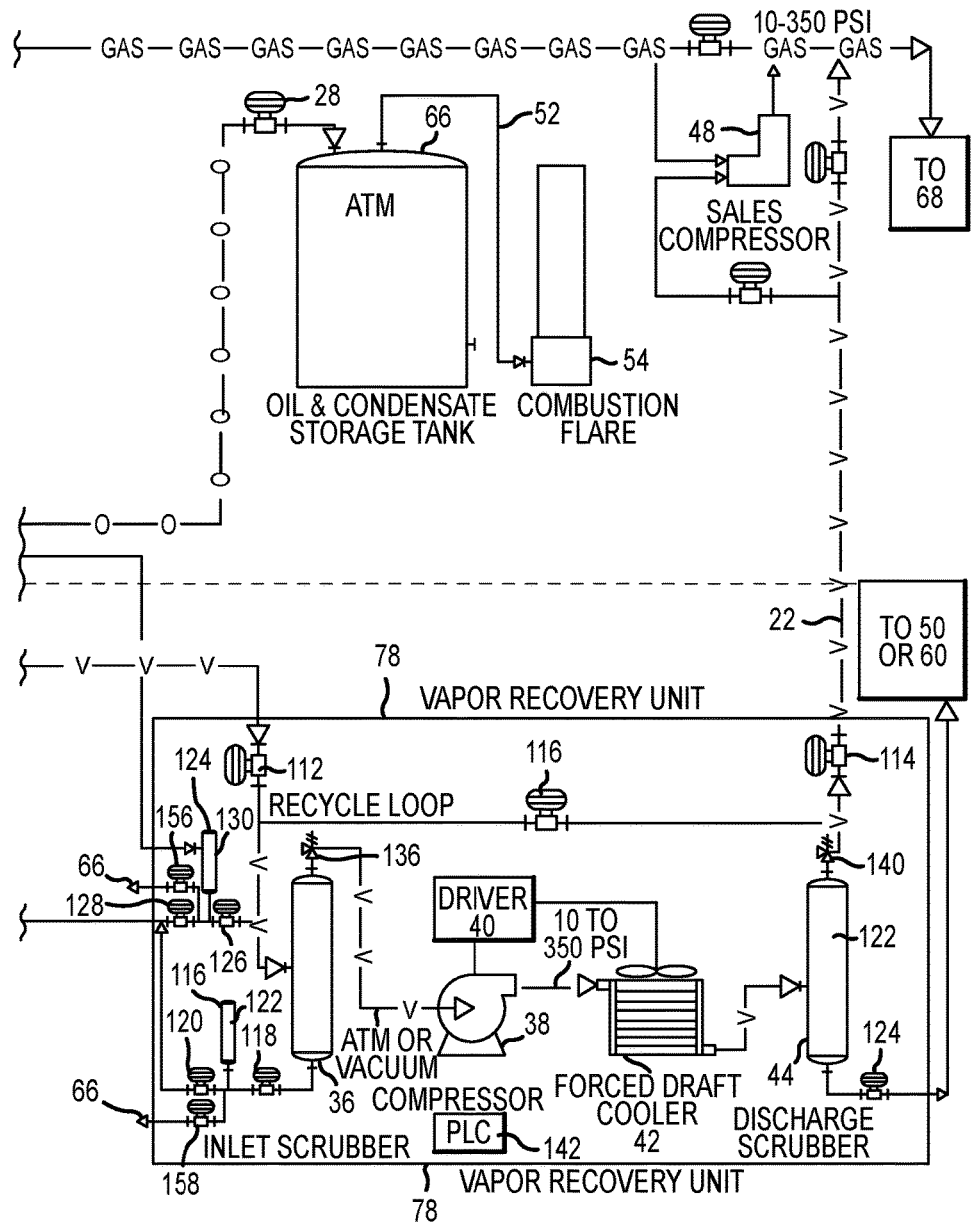
Figures 1, 3B:
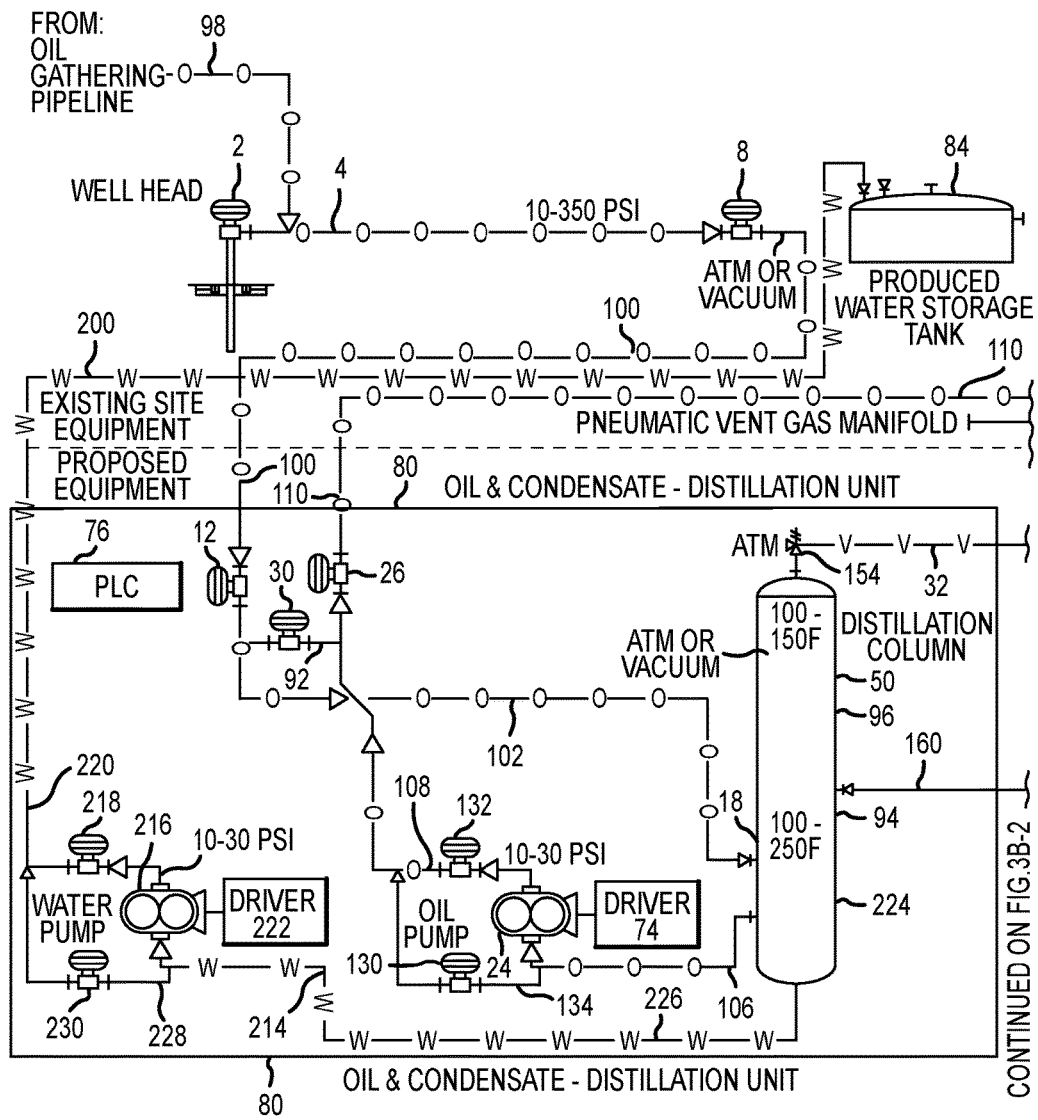
FIG. 3B depicts a more detailed flow diagram of an oil and condensate processing system in accordance with the embodiment of FIG. 2B.
Figures 2, 3B:
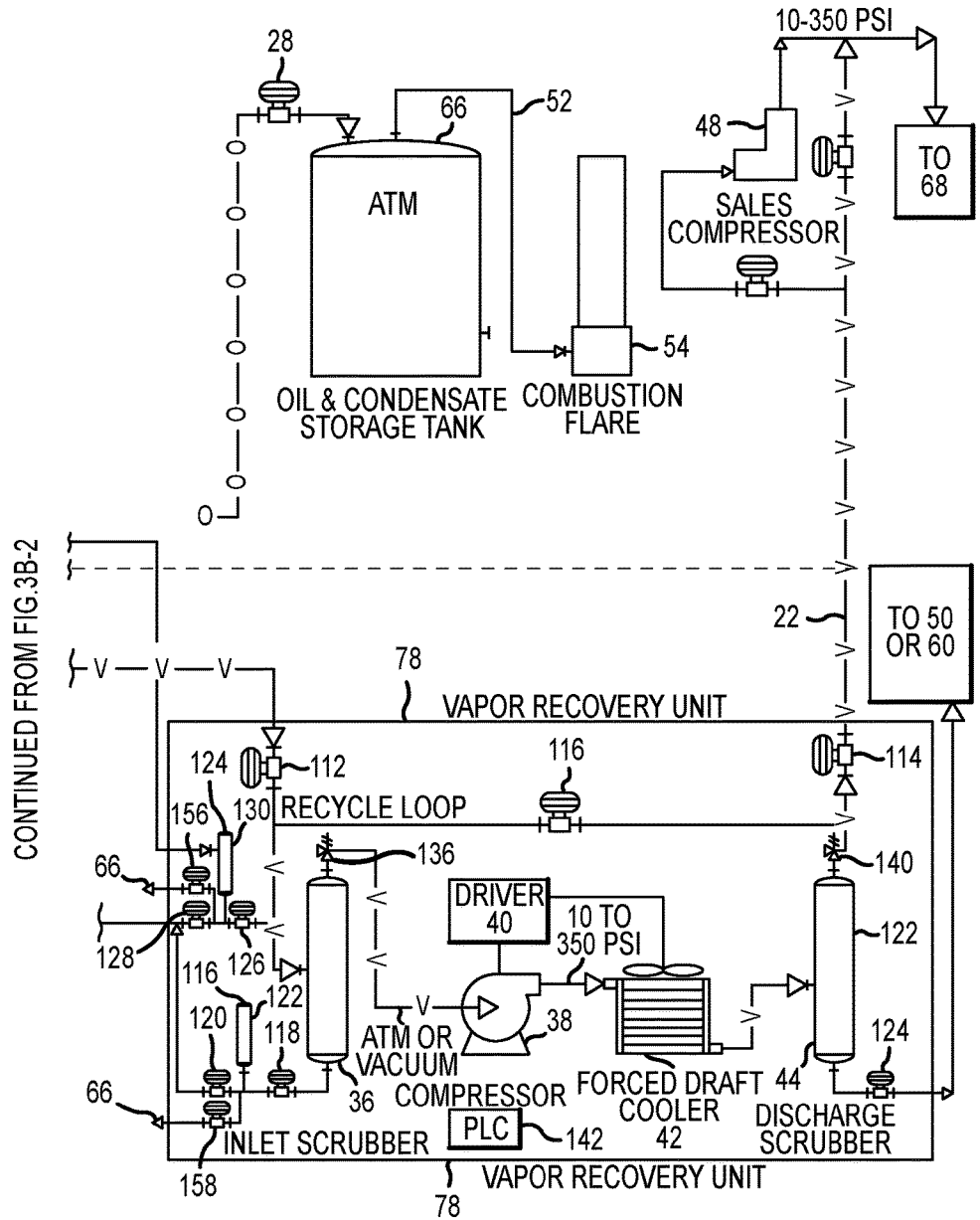

FIG. 3B depicts a more detailed flow diagram of an oil and condensate processing system 1 in accordance with the embodiment of FIG. 2B. The system 1 generally includes an oil and gas well head 2 or oil gathering pipeline 98, a produced water storage tank 84, an oil and condensate distillation unit 80, a vapor recovery unit 78, a sales line compressor 48, oil and condensate storage tank(s) 66, and a combustion flare 54, and may or may not be used in conjunction with a production separator 6.

An oil and condensate mixture that includes oil, condensate, water and natural gas is transmitted from an oil and condensate source to an oil and condensate distillation unit 80 for separation of the hydrocarbon mixture. The oil and condensate distillation unit 80 removes natural gas from the hydrocarbon mixture and transmits the removed natural gas through a conduit 32 to the vapor recovery unit 78. The natural gas then leaves vapor recovery unit 78 to a sales line compressor 48 or natural gas pipeline. Water is removed from the hydrocarbon mixture through a conduit 214 to produced water tank storage tanks 84. Oil and condensate are transmitted from the oil and condensate distillation unit 80 through a control valve 26 through conduit 110 to the oil and condensate storage tanks (s) 66.

Figure 4A:
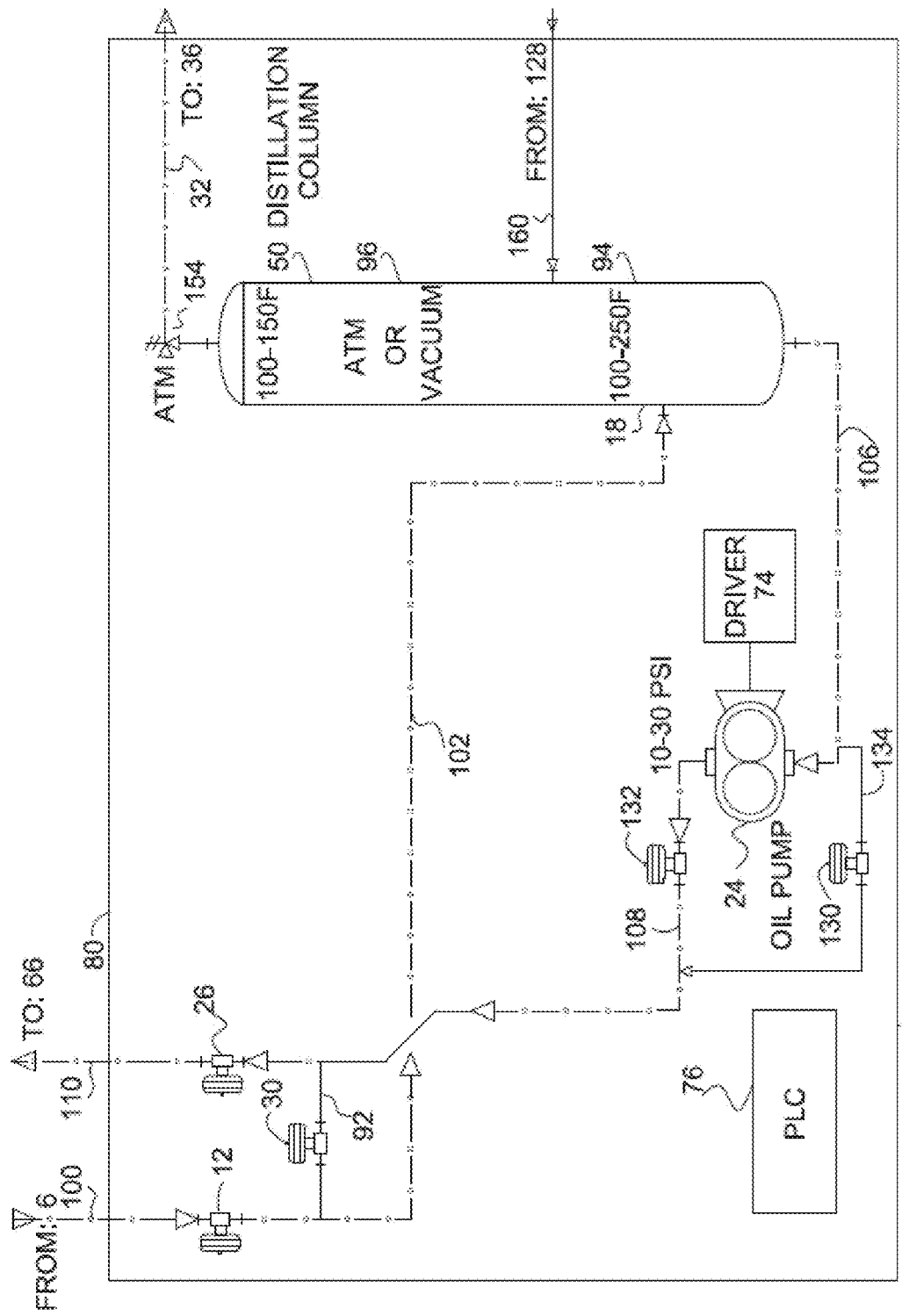
FIG. 4A depicts a flow diagram of an embodiment of the oil and condensation distillation unit of the oil and condensate processing system in accordance with the embodiment of FIG. 2A.
Figure 4B:
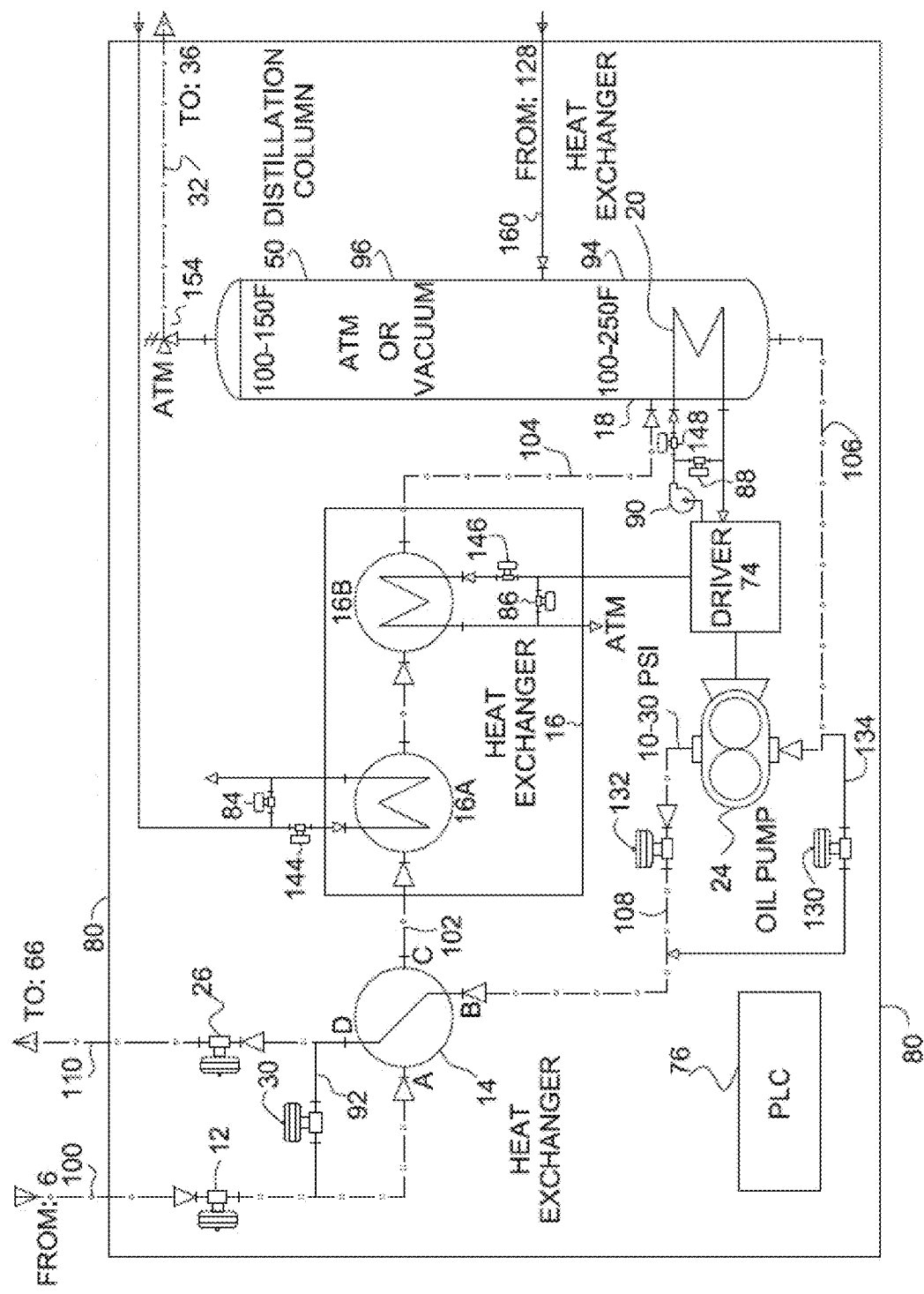
FIG. 4B depicts a flow diagram of another embodiment of the oil and condensation distillation unit of the oil and condensate processing system in accordance with the embodiment of FIG. 2A.
Figure 4C:
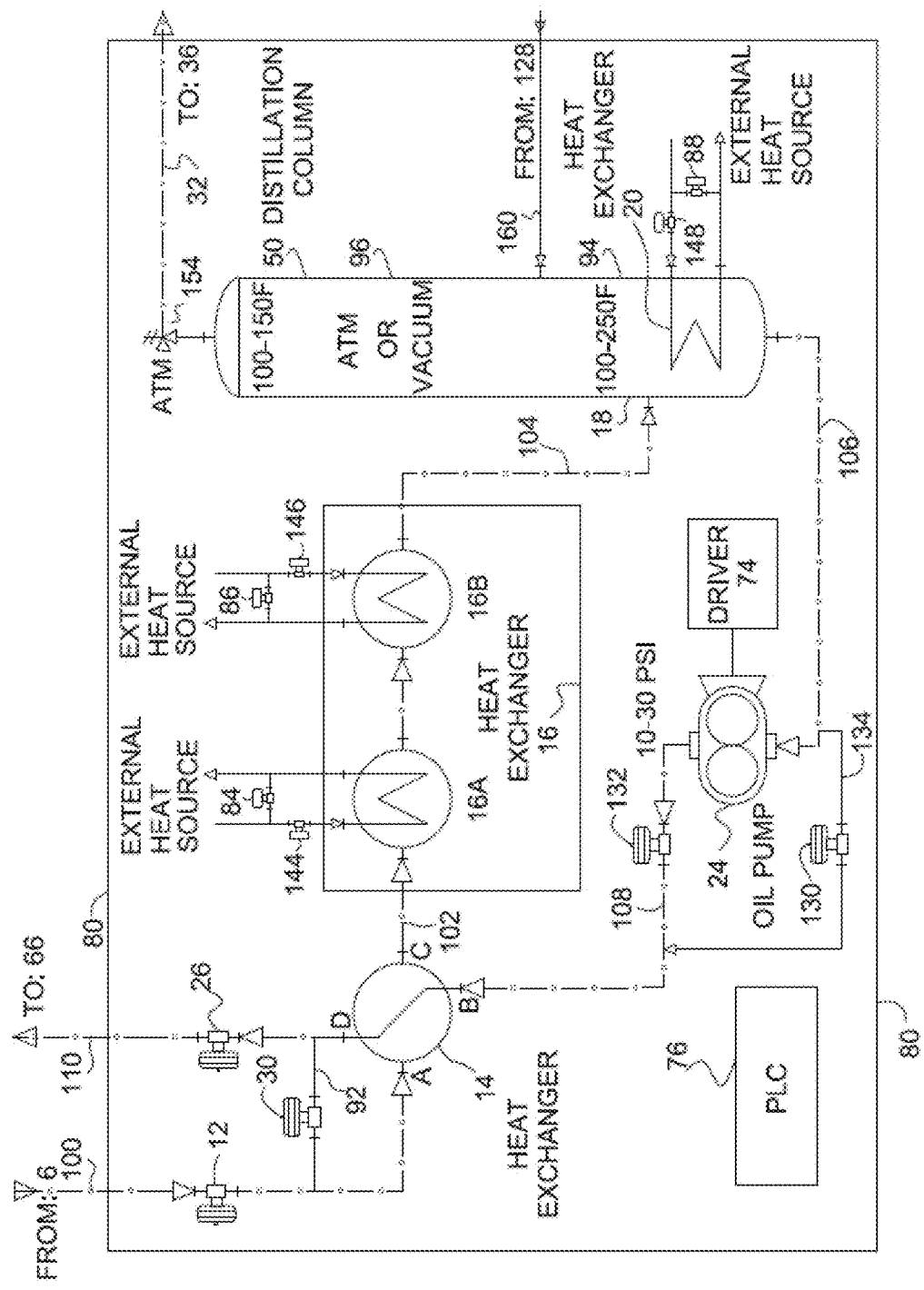
FIG. 4C depicts a flow diagram of yet another embodiment of the oil and condensation distillation unit of the oil and condensate processing system in accordance with the embodiment of FIG. 2A.
Figure 4D:
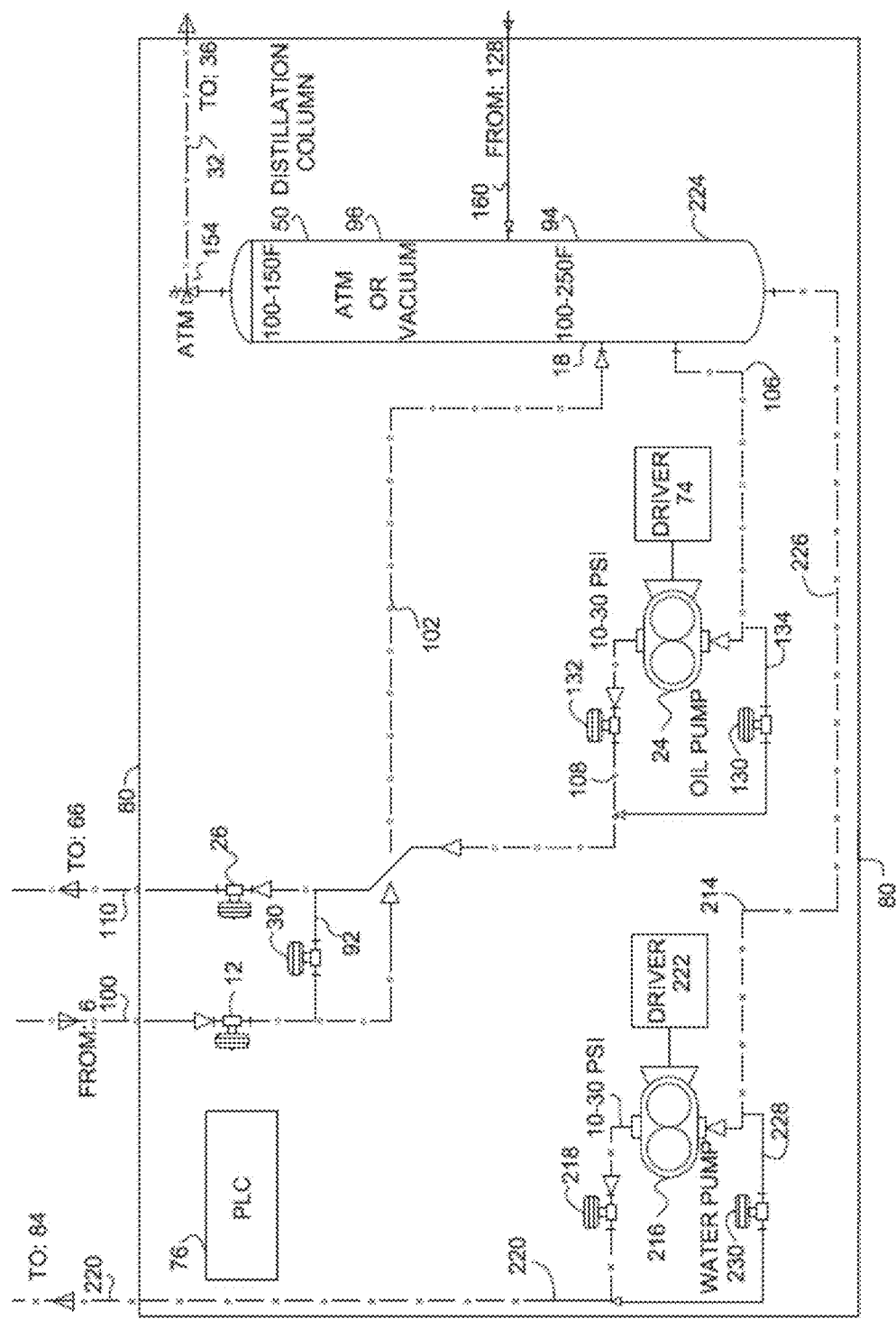
FIG. 4D depicts a flow diagram of yet another embodiment of the oil and condensation distillation unit of the oil and condensate processing system in accordance with the embodiment of FIG. 2B.

FIGS. 4A-C depict flow diagrams of three embodiments (embodiments A, B, C, respectively) of the oil and condensation distillation unit 80 of the oil and condensate processing system 1 in accordance with the embodiment of FIG. 2A. FIG. 4D depicts a flow diagram of yet another embodiment (embodiment D) of the oil and condensation distillation unit of the oil and condensate processing system in accordance with the embodiment of FIG. 2B.

Generally, embodiments A, B and C share the fundamental low pressure/vacuum conditions necessary for the recovery process described above, but differ slightly in the precise amounts of vapor that are captured. Embodiments B and C slightly increase the overall capture rate by adding heat to the oil entering the distillation column 50 which further aids the liberation of natural gas from oil. Embodiment B uses waste heat within the system 1 as a heating medium for the oil entering the column 50, while embodiment C introduces heat from an external source such as a boiler in order to heat the oil entering the distillation column 50.

FIG. 4A (embodiment A) is the preferred and exemplary embodiment of the system 1 as it requires no additional energy in the system to heat the oil entering the distillation column 50. Without heat, embodiment A captures approximately 98% flash vapor or 9.3% to 41.6% more captured vapors than existing technology/approaches. Depending on the size and location of the production facility, for example, it may be economical to utilize embodiment B or C, using energy to heat the oil in the system 1 but improving overall capture to 99%, or 7.1% to 34.6% more vapor captured than existing technology/approaches.

Turning to FIG. 4A (embodiment A), simulation and modeling have shown that at 150 deg F. and ATM conditions in the distillation column 50, up to approximately 98% vapor is captured, representing an improvement of approximately 9.3% to 41.6% improvement over conventional processes. The oil and condensate distillation unit 80 includes a distillation column 50 and an oil pump 24. Oil and condensate removed from the production separator 6 is transmitted to the distillation column 50 where vapor is collected at atmospheric or vacuum pressure conditions. An oil pump 24 transmits the oil and condensate to the oil and condensate storage tanks 66 (See FIG. 2). The oil pump driver 74 may be in the form of an engine or motor of types known in the art.

Turning to FIG. 4B (embodiment B), simulation and modeling have shown that at 250 deg F. and ATM conditions in the distillation column 50, up to approximately 98.6% vapor is captured, representing a slight improvement over embodiment A. The oil and condensate distillation unit 80 includes a heat exchanger 14, a heat exchanger 16, and a heat exchanger 20. The heat exchanger 16 may have multiple stages; here, there are two stages, 16A and 16B. Oil and condensate that is removed from the production separator 6 (See FIGS. 1B, 2) is transmitted through a conduit 100 to the heat exchanger 14 is heated by the processed oil and condensate exiting the oil pump 24. The heated oil and condensate exits the heat exchanger 14 via an exit C and through a conduit 102 flowing into the heat exchanger 16 where it is further heated. The heat exchanger stage 16A is heated by engine exhaust from a compressor driver 40 (See FIG. 2) and a heat exchanger stage 16B is heated by engine exhaust from an oil pump driver 74. The heated oil exits the heat exchanger 16 through a conduit 104 and flows to the distillation column 50, where an optimal temperature may be maintained by the heat exchanger 20. The heat exchanger 20 may be heated by engine jacket water from either a pump driver 74 or a compressor driver 40 (See FIG. 2).

Oil and condensate then exit the distillation column 50 through a conduit 106 to an oil pump 24. The oil pump 24 transmits the heated oil and condensate through a valve 132 through a conduit 108 into the heat exchanger 14 via an entrance B, the oil and condensate is cooled, then transmitted via an exit D through a conduit 110 to the oil and condensate storage tanks 66 (See FIG. 2). The oil pump 24, the oil pump driver 74 and/or the compressor driver 40 as shown in FIG. 2 may be in the form of an engine or motor of types known in the art.

Turning to FIG. 4C (embodiment C), simulation and modeling have shown that at 250 deg F. and ATM conditions in the distillation column 50, up to approximately 99% vapor is captured, representing an improvement of approximately 7.1% to 34.6% improvement over conventional processes. The oil and condensate distillation unit 80 includes the heat exchanger 14, the heat exchanger 16 and the heat exchanger 20. The heat exchanger 16 may have multiple stages; here there are two stages, 16A and 16B. Oil and condensate that is removed from the production separator 6 (See FIG. 2) is transmitted through a conduit 100 to the heat exchanger 14 via an entrance A wherein the oil is heated. The heat exchanger 14 is heated by the processed oil and condensate exiting the oil pump 24. The oil and condensate exits heat exchanger 14 via an exit C through the conduit 102 flowing into the heat exchanger 16 where it is further heated. The heat exchanger 16A and 16B is heated by an external heat source. The heated oil exits the heat exchanger 16 through the conduit 104 and flows to the distillation column 50 wherein optimal temperature is maintained by the heat exchanger 20. The heat exchanger 20 is heated by an external heat source. Oil and condensate then exit the distillation column 50 through the conduit 106 to the oil pump 24. The oil pump 24 transmits the heated oil and condensate through a valve 132 through a conduit 108 into the heat exchanger 14 via the entrance B, wherein the oil and condensate is cooled, then transmitted via an exit D through the conduit 110 to the oil and condensate storage tanks 66 (See FIG. 2). The oil pump 24 and the oil pump driver 74 may be in the form of types known in the art.

FIG. 4D depicts a flow diagram of yet another embodiment (embodiment D) of the oil and condensation distillation unit of the oil and condensate processing system in accordance with the embodiment of FIG. 2B. Generally, embodiments A-D share the fundamental low pressure/vacuum conditions necessary for the recovery process described above, but differ slightly in the precise amounts of vapor that are captured. Embodiment D increases oil and condensate production rates at the well in addition to delivering the vapor recovery benefits of any of the embodiments A, B, or C. Embodiment D slightly improves oil and condensate production by decreasing plunger lift time intervals which is achieved by reducing the vapor pressure above the oil in the well head 2. Embodiment D may also use waste heat within the system 1, or from an external source as a heating medium for the oil, water and natural gas entering the distillation column 50.

FIG. 4D (embodiment D) is another exemplary embodiment of the system 1 as it requires no additional energy in the system to heat the oil, water and natural gas entering the distillation column 50. Embodiment D captures approximately 98% flash vapor or 9.3% to 41.6% more captured vapors than existing technology/approaches. Depending on the size and location of the production facility, for example, it may be economical to utilize embodiment B or C, using energy to heat the oil in the system 1 but improving overall capture to 99%, or 7.1% to 34.6% more vapor captured than existing technology/approaches. Additionally, Embodiment D improves oil and condensate production rates by 1-3% by applying low pressure or a vacuum directly at the well head 2. Applying low pressure or vacuum at the well head 2 increases the speed and frequency at which plunger lift systems operate.

Turning to FIG. 4D (embodiment D), simulation and modeling have shown that at 150 deg F. and ATM conditions in the distillation column 50, up to approximately 98% vapor is captured, representing an improvement of approximately 9.3% to 41.6% improvement over conventional processes. The oil and condensate distillation unit 80 includes a distillation column 50, an oil pump 24, and a water pump 216. Oil and condensate removed from the well head 2 is transmitted to the distillation column 50 where vapor is collected at atmospheric or vacuum pressure conditions. An oil pump 24 transmits the oil and condensate to the oil and condensate storage tanks 66 (See FIG. 2 or 2A). A water pump 216 transmits the water to the water storage tanks 84 through control valve 218 and conduit 220. The oil pump driver 74 and water pump driver 222 may be in the form of an engine or motor or other technology to transfer oil and water of types known in the art.

Figure 5:
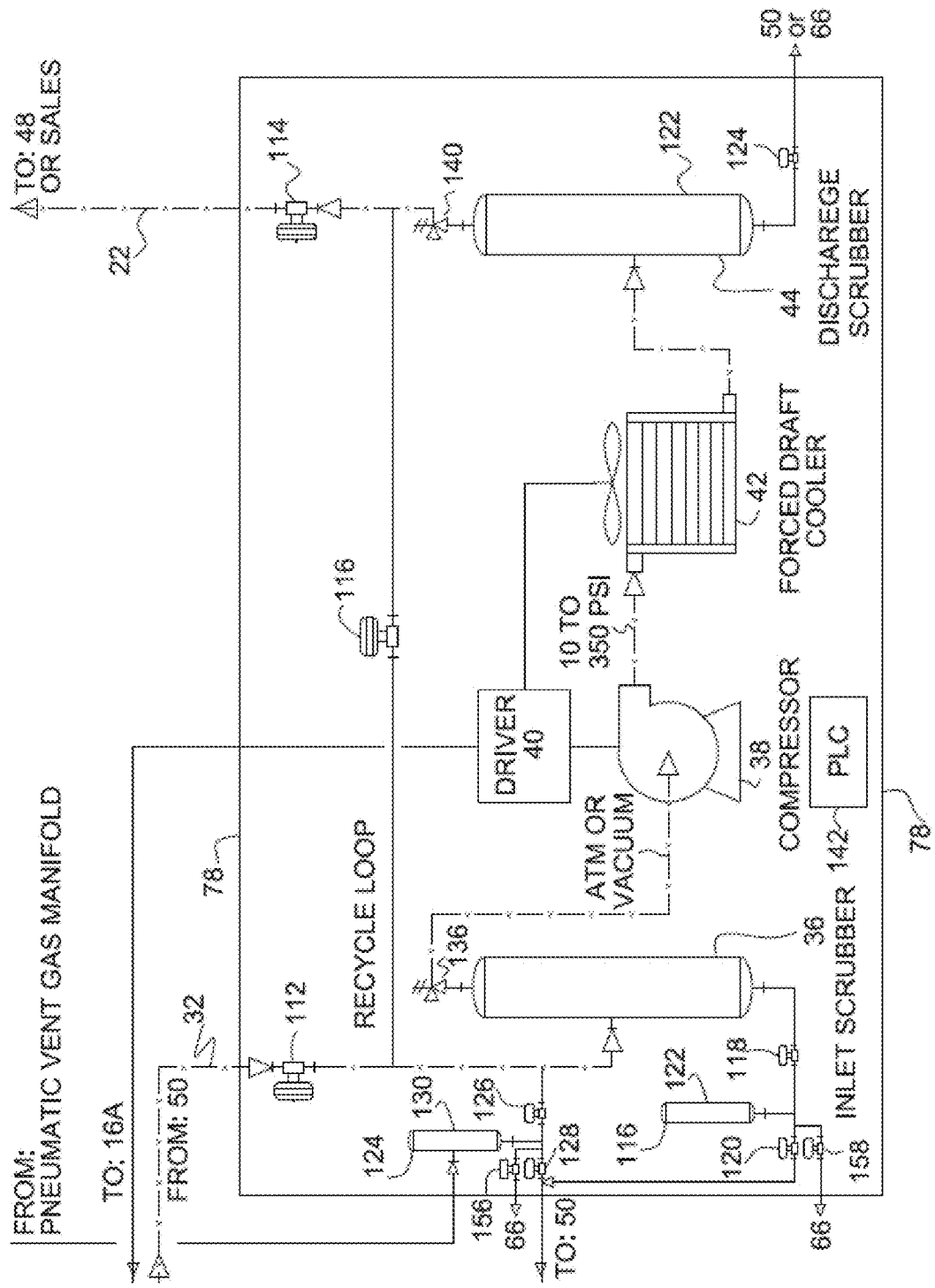
FIG. 5 depicts a flow diagram of the vapor recovery unit of the oil and condensate processing system in accordance with the embodiments of either FIG. 2A or 2B.

FIG. 5 depicts a flow diagram of the vapor recovery unit 78 of the oil and condensate processing system 1 in accordance with the embodiment of either of FIG. 2A or 2B. The vapor recovery unit 78 comprises an inlet suction scrubber 36, a compressor 38 of a type known in the art, a forced draft cooler 40, and a discharge scrubber 44. Vapor that is removed from the distillation column 50 through the conduit 32 to the inlet suction scrubber 36 where excess liquids are scrubbed prior to compression. The vapor then flows into the compressor 38 where it is compressed. Thereafter the vapor flows to the forced draft cooler 42 where it is cooled. The vapor then flows through the discharge scrubber 44 where liquids are scrubbed post compression. Vapor is compressed by the compressor 38, cooled by the forced draft cooler 42, the exits the discharge scrubber 44 flowing to sales compressor 48 (FIG. 1) as depicted. In particular embodiments the vapor exits the discharge scrubber 44 and flows directly into the natural gas sales pipeline (See FIGS. 3A-B). The compressor driver 40 may be in the form of an engine or motor of types known in the art.

As shown in FIG. 5, an inlet suction scrubber 36 is used to remove liquids that form within the conduit 32 and after the control valve 112. The liquids flow into a blow case 116 through a control valve 118. A pneumatic level float 122 controls the opening of a valve 120 and closing of a valve 118 to transmit the liquids out of the blow case. The liquids flow to the distillation column 50 or to the storage tanks 66. In particular embodiments a liquid removal apparatus of a type known in the art may be used to remove liquids from the inlet suction scrubber 36. In particular embodiments the liquid removal apparatus may be controlled by a PLC of a type known in the art.

An outlet scrubber 44 is used to remove liquids that form after the compressor 38 and the forced draft cooler 42 due to compression and cooling of natural gas vapors. The pneumatic level float 122 controls the opening of the valve 124 to transmit the liquids to the distillation column 50 or the storage tanks 66. In particular embodiments the level float 122 and the control valve 124 may be controlled by a PLC 142 of a type known in the art.

Also, a pneumatic vent gas capture vessel 124 may be used to collect vented gas from the existing pneumatic equipment on production sites and from the pneumatic equipment within the present invention. Vented gas from existing pneumatic equipment onsite and pneumatic equipment within the present invention flows into the capture vessel 124. A pressure instrument 130 monitors the vessel pressure and a PLC 142 controls the opening of valves 126, 128, and 156, i.e. the control valve 128 closes, the valve 156 closes, the valve 126 opens and then captured vent gas flows to the inlet scrubber 36. In the event of a compressor 38 non operation, the captured vent gas flows through the valve 128 to the distillation column 50 (See FIGS. 3A-B) or through the valve 156 to the storage tanks 66 (See FIGS. 3A-B). In particular embodiments a liquid removal apparatus of a type known in the art may be used to remove liquids from the vessel 124. In particular embodiments the liquid removal apparatus may be controlled by a PLC of a type known in the art. In particular embodiments the pressure instrument 130, the control valve 126, the valve 128, and the valve 156 may be controlled by pneumatics or a PLC of a type known in the art.

Figure 6:
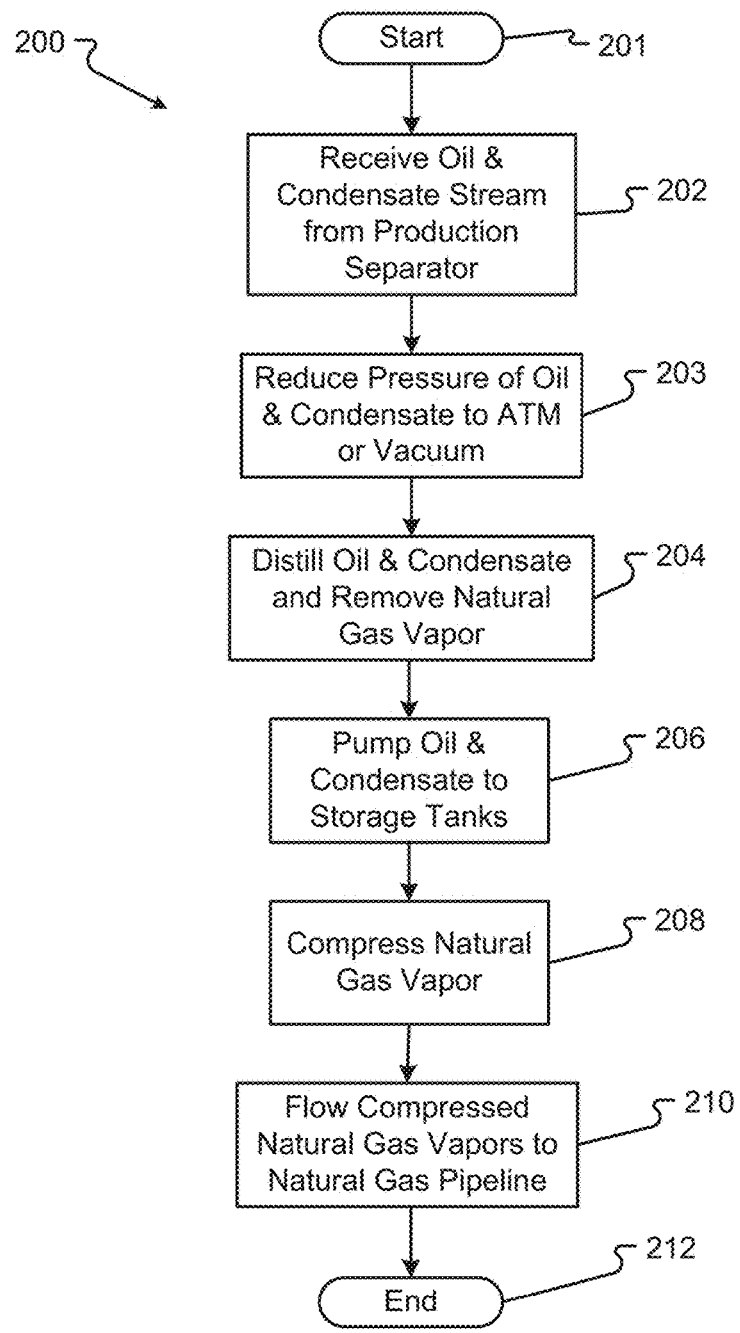
FIG. 6 depicts a method for the oil and condensate processing system in accordance with the embodiment of FIG. 1B.
Figure 7:
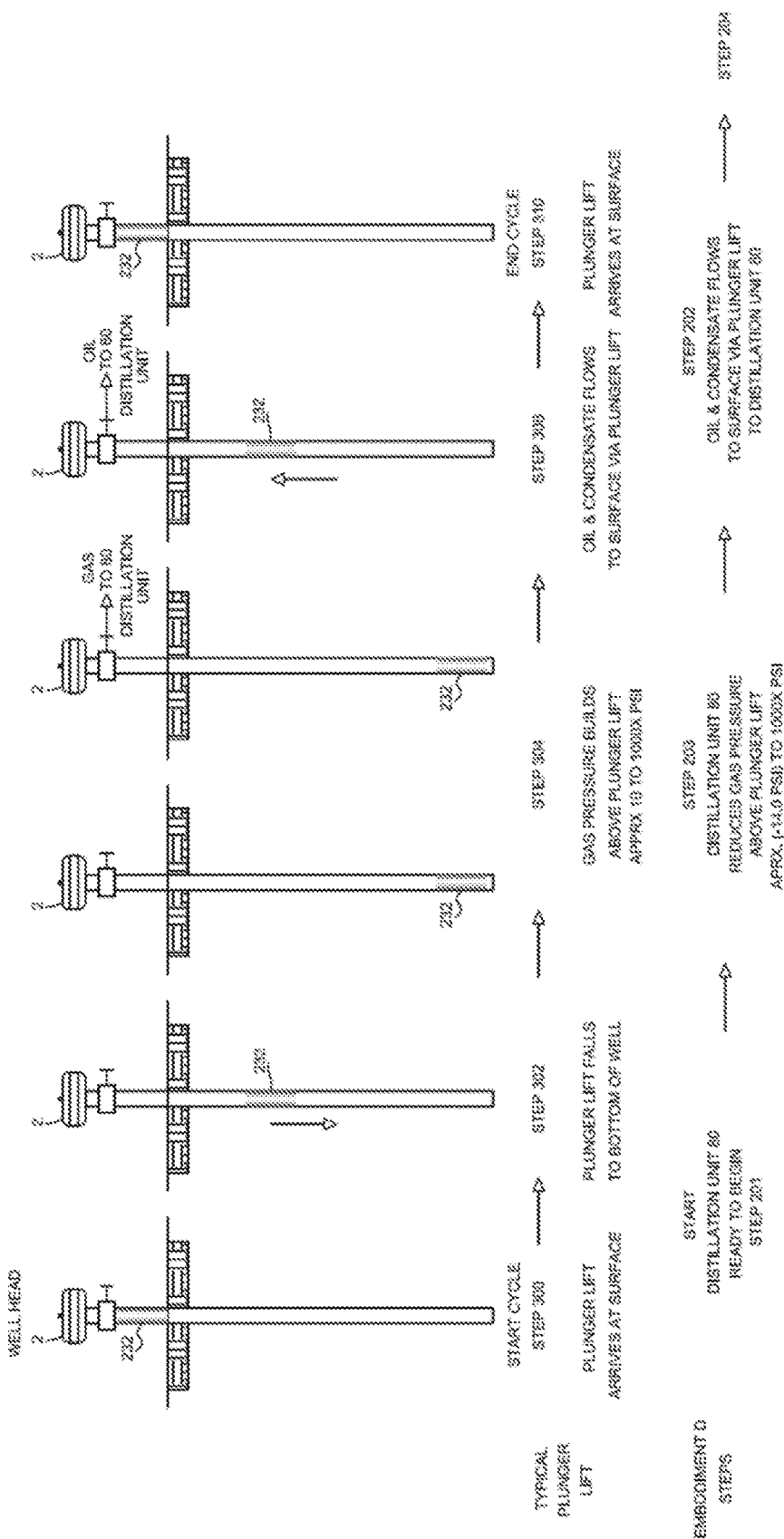
FIG. 7 depicts a method for the plunger lift system in accordance with the embodiment of FIG. 2B.

An embodiment of a method 200 for oil and condensate processing is shown in FIG. 6. While a general order for the steps of the method 200 is shown in FIG. 7, the method 200 can include more or fewer steps or can arrange the order of the steps differently than those shown in FIG. 7. (For example, in embodiment D (i.e. FIGS. 2B, 4D and 7), the method 200 starts with the operation 203, then moves to operation 202, then on to operation 204.) Generally the method 200 starts with a start operation 202 and ends with an end operation 212. The method 200 can be executed as a set of computer-executable instructions executed by a computer system and encoded or stored on a computer readable medium. Hereinafter, the method 200 shall be explained with reference to the systems, components, modules, etc. described in conjunction with FIGS. 1-5 and 7.

At step 202, an oil and condensate mixture (which contains oil, natural gas and condensate at typical production separator pressure) stream is received from a production separator 6. At step 203, the pressure of the received stream of oil and condensate from step 202 is reduced to ATM or vacuum pressure. In Embodiment D (i.e. FIGS. 2B, 4D and 7) beginning with step 203, the vapor pressure above the oil and condensate is reduced at well head 2 then moving to step 202 the oil and condensate mixture (which contains oil, natural gas and condensate at low pressure to vacuum conditions) stream is received from well head 2. At step 204, at atmospheric or vacuum pressure the oil and condensate mixture is distilled and the natural gas vapors are removed. This step involves use of distillation column 50. At step 206, an oil pump (and water pump in embodiment D) transfers processed oil and condensate and water to oil and condensate storage tanks 66 and water storage tanks 84. At step 208, a compressor removes and compresses the natural gas vapors from the distillation column 50. At step 210, compressed natural gas vapors flow to the suction inlet of a sales line compressor or directly to a natural gas pipeline 68.

In particular, with embodiment D of method 200, oil and condensate containing oil, water, and gas is processed directly at an oil and gas well 2. The following steps involve processing the petroleum liquid in lieu of or in conjunction with typical three phase separators, vapor recovery towers, and storage tanks. The following steps are completed to process the oil and condensate at the well head 2: 1) reduce vapor pressure of well head 2 above oil and condensate column; 2) separate oil, water, and vapor from petroleum stream; 3) distill oil and condensate; 4) transfer oil to storage tanks; 5) transfer water to storage tanks; and 6) compress vapor and transfer to sales pipeline.

FIG. 7 depicts a method for the plunger lift system in accordance with embodiment D of FIGS. 2B, 4D and 7. The plunger lift system is used to aid in the recovery of oil and condensate from wellhead 2. Turning to FIG. 7, the steps of a typical plunger lift system are compared to the application of method 200. At step 300 the plunger is held in the wellhead 2 until it is plunger is released, step 302, and falls by force of gravity to the bottom of the well tubing. At step 304, the tubing pressure (vapor pressure above the oil and condensate) typically increases but during the application of method 200 the vapor pressure is reduced by the recovery unit until the optimal ratio of well casing to tubing pressure is reached (low pressure or vacuum conditions above the oil and condensate). At step 308, the plunger begins to move up the well tubing pushing the oil and condensate to the surface. At step 308, the oil and condensate flows to the three phase distillation unit for processing. At step 310, the plunger is captured in the wellhead and held until the released for another cycle starting at step 300.

With respect to FIGS. 1-7, additional details regarding elements, components and subsystems are now described.

Oil Pump Bypass

An Oil pump 24 or a compressor 38 may or may not be utilized in the current process. A PLC 76 enters into an oil pump bypass mode and closes the valve 132. The oil pump bypass mode allows the distillation column 50 to operate between atmospheric pressure and optimal inlet pressure for the sales compressor 48 so as to maintain natural gas vapor recovery without an operational oil pump 24 or a compressor 38. An oil and condensate mixture flows from the conduit 104 into the distillation column 50. Natural gas vapor is removed from the oil and condensate mixture in the distillation column 50. The processed oil and condensate mixture then flows from the distillation column 50 through the conduit 106 to the conduit 134 then to the valve 130. The processed mixture bypasses the oil pump 24 flowing through the conduit 134 and the valve 130 to the conduit 108. The level of oil and condensate in the distillation column 50 is measured by a level instrument 94. The level instrument 94 may include pneumatic controls or be operably associated with programmable logic controllers of a type known in the art. The PLC 76 opens the valve 130 when oil and condensate mixture reaches a predetermined level in the distillation column 50. The oil and condensate mixture exits the distillation column 50 flowing through the conduit 106 to the conduit 134 through the valve 130, bypassing the oil pump 24, and flowing to the storage tanks 66.

Water Pump Bypass

Turning to embodiment D and FIG. 4D, the processed water flows from the distillation column 50 through the conduit 226 to the conduit 228 then to the valve 230. The water bypasses the water pump 216 flowing through the conduit 226 to the conduit 228 through the valve 230 to conduit 220. The level of water in the distillation column 50 is measured by a level instrument 224. The level instrument 224 may include pneumatic controls or be operably associated with programmable logic controllers of a type known in the art. The PLC 76 opens the valve 230 when water reaches a predetermined level in the distillation column 50. The water exits the distillation column 50 flowing through the conduit 226 to the conduit 228 through the valve 230, bypassing the water pump 216, and flowing to the storage tanks 84 through conduit 220.

Pressure Safety Valves

The pressure relief valve 154 exists for circumstances when the vapor recovery compressor 38 is not in operation to ensure the distillation column 50 does not exceed a safe pressure. The pressure relief valve 136 and the relief valve 140 exist for safety to vent gas to atmosphere if the inlet scrubber 136 or the outlet scrubber 140 over-pressurizes.

Hand Style Isolation Valves

All major equipment has isolation valves of hand type known in the art.

Distillation Column (50)

With respect to embodiment A (FIG. 4A), oil and condensate pass through the conduit 102 and enters the distillation column 50. The distillation column 50 operates in the pressure ranges of approximately negative 14.0 psig (vacuum) up to atmospheric pressure. The oil and condensate temperature ranges from ambient temperature to approximately 150 dg F. The distillation column 50 removes vapors from the oil and condensate which are liberated from the liquid phase to vapor phase by the process of applying a vacuum or atmospheric pressure within the distillation column. The vapors are removed through the conduit 32 to the inlet of the vapor recovery unit 78 (See FIG. 3A or 3B) as previously described. The vapor recovery unit can be of a type known in the art. In the particular embodiments of A the internals of the distillation column 50 may incorporate contours or structures to enhance the removal of vapors from the oil and condensate or for the purpose of separating the vapors into fundamental chemical components such as propane and butane.

With respect to embodiment B (FIG. 4B), oil and condensate exit the heat exchanger 16 via the conduit 104 and enters the distillation column 50. The distillation column 50 operates in the pressure ranges of approximately negative 14.0 psig (vacuum) up to atmospheric pressure and oil temperature ranges from approximately 150 dg F to 170 dg F within the distillation column. The distillation column 50 liberates vapors from the liquid phase to vapor phase by the process of heating the oil and condensate by heat exchangers 14, 16, and 20, and by applying a vacuum or atmospheric pressure within the distillation column. The heated oil and condensate temperature at the bottom of the column ranges from approximately 150 dg F to 170 dg F. The vapor temperature at the top of the column is approximately 150 dg F. The vapors are removed through conduit 32 to the inlet of the vapor recovery unit 78 as previously described. The vapor recovery unit can be of a type known in the art. In the particular embodiment of B the internals of distillation column 50 may incorporate contours, structures, or additional heat exchangers to enhance the removal of vapors from the oil and condensate or for the purpose of separating the vapors into fundamental chemical components such as propane and butane.

With respect to embodiment C (FIG. 4C), the oil and condensate exit the heat exchanger 16 and enter a distillation column 50. The distillation column 50 operates in the pressure ranges of approximately negative 14.0 psig (vacuum) up to atmospheric pressure and oil temperature ranges from approximately 150 dg F to 250 dg F and up to the thermal cracking temperature of hydrocarbons within the distillation column. The distillation column 50 removes vapors liberated from the liquid phase to vapor phase by the process of heating the oil and condensate by the heat exchangers 14, 16, and 20, and by applying a vacuum or atmospheric pressure within the distillation column. The heated oil and condensate temperature at the bottom of the column is approximately 150 to 250 dg F. The vapor temperature at the top of the column is approximately 150 dg F. The vapors are removed through the conduit 32 to the inlet of the vapor recovery unit 78 as previously described. The vapor recovery unit can be of a type known in the art. In the particular embodiment of C, the internals of distillation column 50 may incorporate contours, structures, or additional heat exchangers to enhance the removal of vapors from the oil and condensate or for the purpose of separating the vapors into fundamental chemical components such as propane and butane.

With respect to FIG. 4D (Embodiment D) oil, condensate, and water pass through the conduit 102 and enters the distillation column 50. The distillation column 50 operates in the pressure ranges of approximately negative 14.0 psig (vacuum) up to atmospheric pressure. The oil, condensate and water temperature ranges from ambient temperature to approximately 150 dg F. The distillation column 50 removes vapors from the oil and condensate which are liberated from the liquid phase to vapor phase by the process of applying a vacuum or atmospheric pressure within the distillation column. The distillation column 50 separates the water from the oil and condensate and the water is transferred to water storage tanks 84 via water pump 216 through conduit 220 and control valve 218. The vapors are removed through the conduit 32 to the inlet of the vapor recovery unit 78 (See FIG. 3A or 3B) as previously described. The vapor recovery unit can be of a type known in the art. In the particular embodiments of D the internals of the distillation column 50 may incorporate contours or structures to enhance the removal of vapors from the oil and condensate or for the purpose of separating the vapors into fundamental chemical components such as propane and butane. Embodiment D may or may not utilize any of the heat exchangers from embodiments A, B, or C to aid in vapor recovery.

Distillation Unit—Temp Control

With respect to embodiment A (FIG. 4A), no heat is generally used, i.e. the temperature of oil and condensate is not controlled above or below ambient conditions.

With respect to embodiments B and C (FIGS. 4B and 4C, respectively), the temperature of the heated oil and condensate entering the distillation column 50 is measured by a temperature instrument 18 of a type known in the art. The temperature instrument 18 includes or is operably associated with programmable logic controllers of a type known in the art. The programmable logic controllers 76 control the temperature via control valves 84, 86, 88, 144, 146, and 148. These six (6) control valves will be selectively actuated to allow the heat sources to bypass the heat exchangers 16 and 20 maintaining optimal heat exchanger temperatures. The programmable logic controllers will open the temperature bypass valve 84 first until it is fully open and the valve 144 is closed. Next, the temperature bypass valve 86 is opened until it is fully open and the valve 146 is closed. Thereafter, the temperature bypass valve 88 is opened until it is fully open and the valve 148 is closed. Optionally, in particular embodiment B (FIG. 4B), the engine water coolant auxiliary pump 90 may be used to help compensate for any pressure drop by circulating engine water coolant through the heat exchanger 20.

Distillation Unit—Level Control & Recycle

The level of oil and condensate in the distillation column 50 is measured by a level instrument 94. The level instrument 94 includes or is operably associated with a programmable logic controller of a type known in the art. The programmable logic controller 76 controls the heated oil and condensate level via a recycle loop using control valves. The control valves 12, 26, and 30 are used to control a recycle loop wherein processed oil and condensate exiting the heat exchanger 14 via exit D may be recycled via the conduit 92 back into the heat exchanger 14 via the entrance A flowing back through the distillation unit 80. The programmable logic controller closes the valve 26 and closes the valve 12 and opens the valve 30. Thereafter, partial or complete flow of heated oil and condensate is recycled through the oil distillation unit 80 in a recycle loop to maintain optimal oil and condensate level in the distillation column 50. In particular embodiments of C, the programmable logic controller may monitor and/or control a variable frequency drive to vary the oil pump speed (oil flow) to control the oil level in the distillation column 50.

The water level in the distillation column 50 is measured by a level instrument 224. (FIGS. 3B and 4D) The level instrument 224 includes or is operably associated with a programmable logic controller of a type known in the art. The programmable logic controller 76 controls the water level using control valves 218 and 130.

Vapor Recovery Unit—Pressure Control & Recycle

The distillation column pressure is measured by a pressure instrument 96 (See FIG. 3A or 3B). The pressure instrument 96 includes or is operably associated with programmable logic controllers of a type known in the art. FIG. 5 depicts a programmable logic controller 142 that controls the pressure via a control valve 112. The control valve 112 is used to control the vacuum applied to the distillation column by the compressor 38. During periods of low or near zero vapor production, the programmable logic controller closes the control valve 112 and the control valve 114 while the control valve 116 is opened. The compressed vapor exiting a discharge scrubber 44 is recycled through the control valve 116 back to the inlet suction scrubber 36. Thereafter, partial flow or complete flow of compressed vapor is recycled through the vapor recovery unit in a loop to maintain on-demand operational status. In a particular embodiment of the embodiment of C, the programmable logic controller 142 may control a variable frequency drive to vary the compressor speed (vapor flow) to control the vacuum applied to the distillation column 50 (See FIG. 3A).

Forced Draft Cooler

FIG. 5 depicts a forced draft cooler 42 used to reduce the temperature of the compressed vapor exiting the compressor 38 to ensure the compressed vapor is within the operating limits for flow measurement, gas quality measurement, and natural gas pipeline specifications. In a particular embodiment, the forced draft cooler 42 is used to reduce the temperature of the compressed vapor to ensure the compressed vapor remains within the acceptable operating limits for a sales compressor 48. In particular embodiments, the forced draft cooler may have louvers controlled by a PLC of a type known in the art.

Benefits

The disclosed system and method provides a superior method for processing oil and condensate by distilling hydrocarbon vapors from the oil and condensate mixture, and increases the speed and frequency at which plunger lift systems operate. Many benefits result from the disclosed system and method. For example, energy conservation and the removal of controlled and fugitive emissions from typical oil and gas production sites is achieved. A processing system constructed and operated in accordance with the present invention captures hydrocarbon gases that are typically released as fugitive emissions or otherwise burned off at flares and delivers them as usable energy to the natural gas sales pipeline. Distilling the oil and condensate mixture removes hydrocarbon gases that negatively affect air quality. Maintaining atmospheric or applying a vacuum maximizes the removal of natural gas vapors from the oil and condensate mixture in the distillation column. By distilling the oil and condensate mixture at atmospheric or vacuum pressure within the distillation column, nearly all of the natural gas vapors are captured.

Also, the processing of the oil and condensate mixture prior to the tanks as disclosed herein eliminates contamination by ambient air commonly observed in oil and condensate storage tanks. Reducing the pressure of the oil and condensate mixture to atmospheric or vacuum conditions improves capture of natural gas vapors by upwards of 40% over prior art. Reducing the pressure of the oil and condensate mixture to atmospheric or vacuum increases the capture of between 98-99% of entrained natural gas vapors in the oil and condensate mixture. The remaining 1-2% of remaining natural gas vapors can be removed by heating the mixture prior to entering the distillation column. Heating the oil and condensate mixture at 35-125 PSI ("Ward") without reducing the pressure to atmospheric or vacuum pressure removes only 64.5% to 94.4% of the entrained natural gas vapors in a mixture. Based on simulation and modeling of prior art ("Ward"), even at maximum capture efficiency Ward is still below the 2012 EPA New Source Performance Standards. Using a natural gas compressor to maintain atmospheric or vacuum pressure along with an oil pump to maintain oil level within the distillation column captures 99%, or virtually all, of the entrained natural gas. The disclosed system and method captures upwards of 40% more of the natural gas vapors entrained in an oil and condensate mixture over systems that heat oil at typical production pressure.

Another benefit provided by the disclosed system and method is the increase in the speed and frequency at which plunger lift systems operate. Increasing the speed and frequency of plunger lifts improves the oil and condensate production rates at a well site significantly improving the financial benefits of the method over vapor recovery alone. Based on simulation and modeling an increase of 1-3% in crude oil production can be expected providing another revenue stream in addition to vapor recovery in the disclosed system and method. (See FIG. 7).

In yet another embodiment, the disclosed systems and methods may be partially implemented in software that can be stored on a storage medium to include a computer-readable medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In one embodiment, the user interacts with the computer through any means known to those skilled in the art, to include a keyboard and/or display to include a touchscreen display. The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

In one embodiment, one or more components of the system or method are automatically controlled. For example, in embodiment D, the well head pressure may be automatically controlled, and/or the types of hydrocarbons gases distilled are controlled. In one embodiment, one or more components of the system or method are automatically controlled via an operator or user who selects desired parameters, conditions, metrics, inputs, and/or outputs via a display and/or screen. For example, a user may select, from a display menu, the hydrocarbons to capture, individually or, for example, by identification of the heaviest hydrocarbon to capture.

Figure 9A:
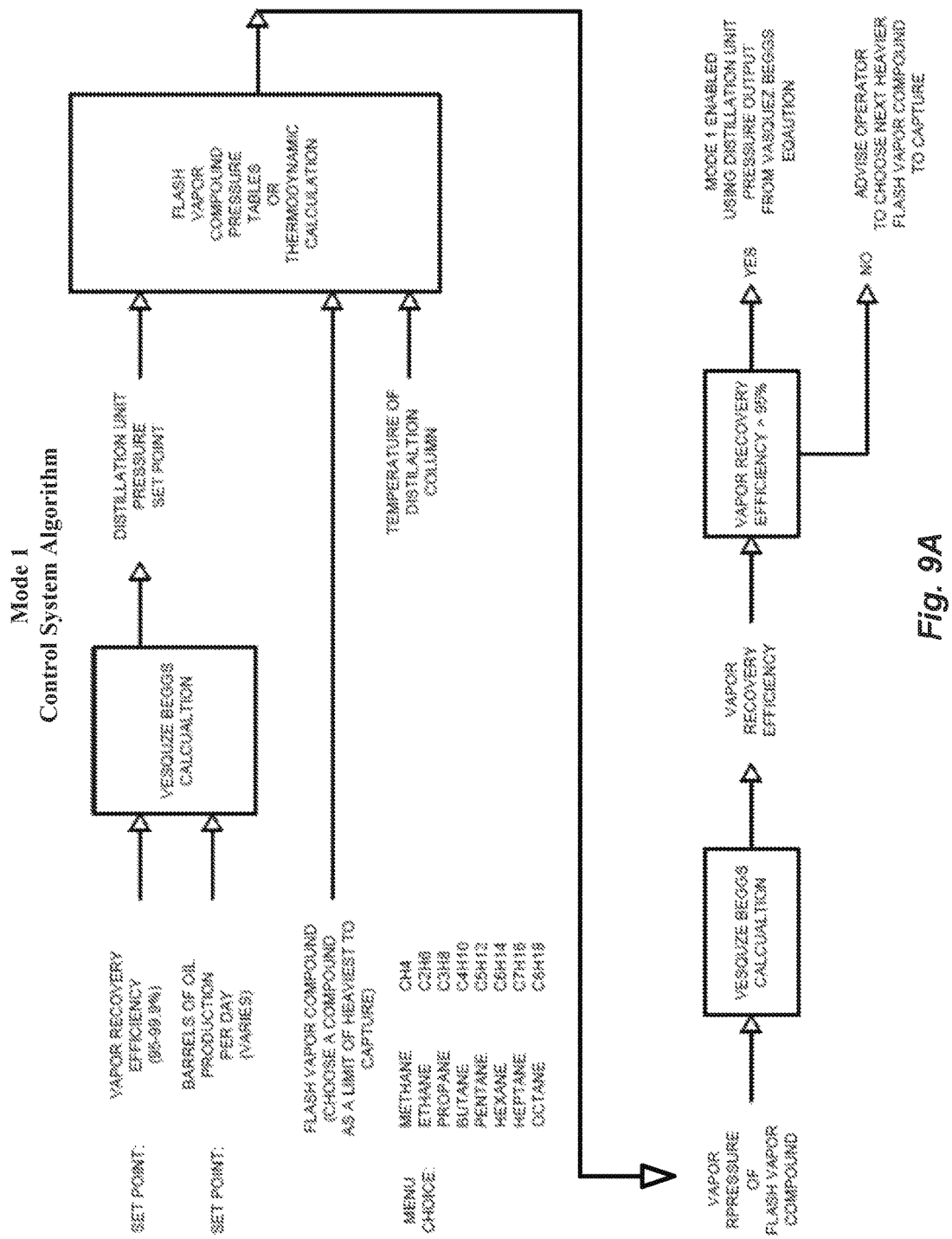
FIG. 9A depicts a flow diagram for an embodiment of a control system algorithm for Mode 1 of the oil and condensate processing system.
Figure 9B:
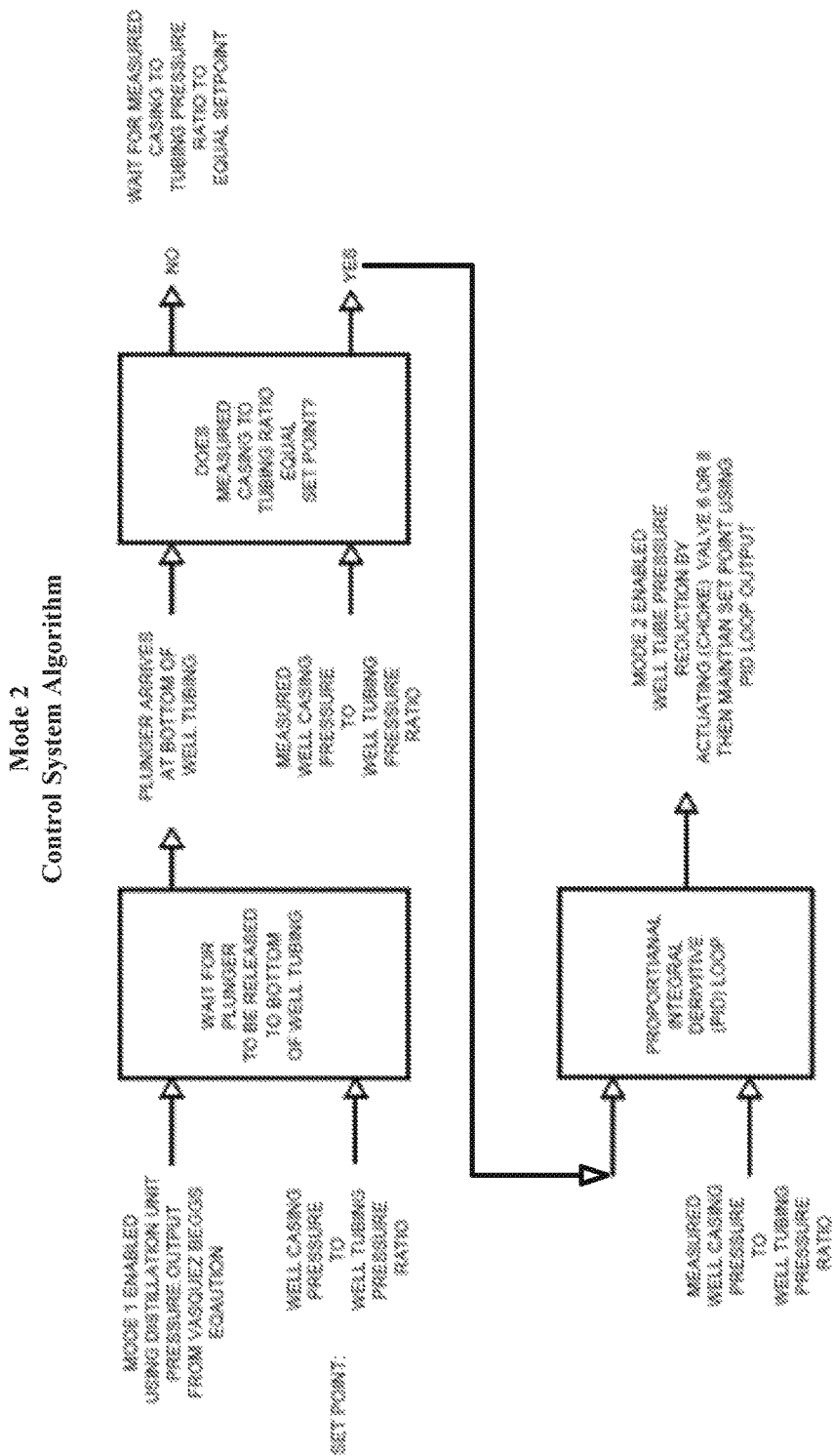
FIG. 9B depicts a flow diagram for an embodiment of a control system algorithm for Mode 2 of the oil and condensate processing system.
Figure 9C:
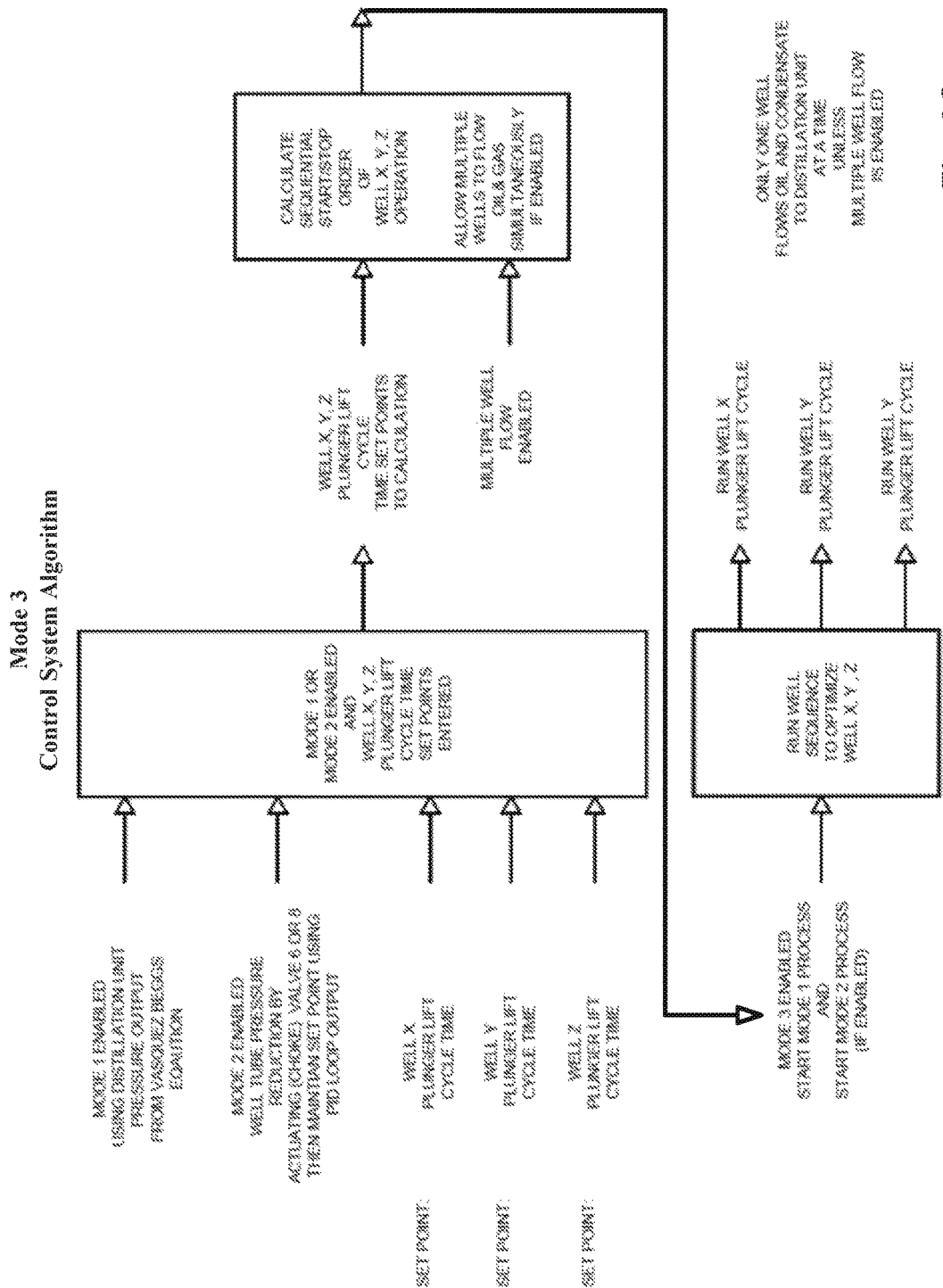
FIG. 9C depicts a flow diagram for an embodiment of a control system algorithm for Mode 3 of the oil and condensate processing system.
Figure 15:
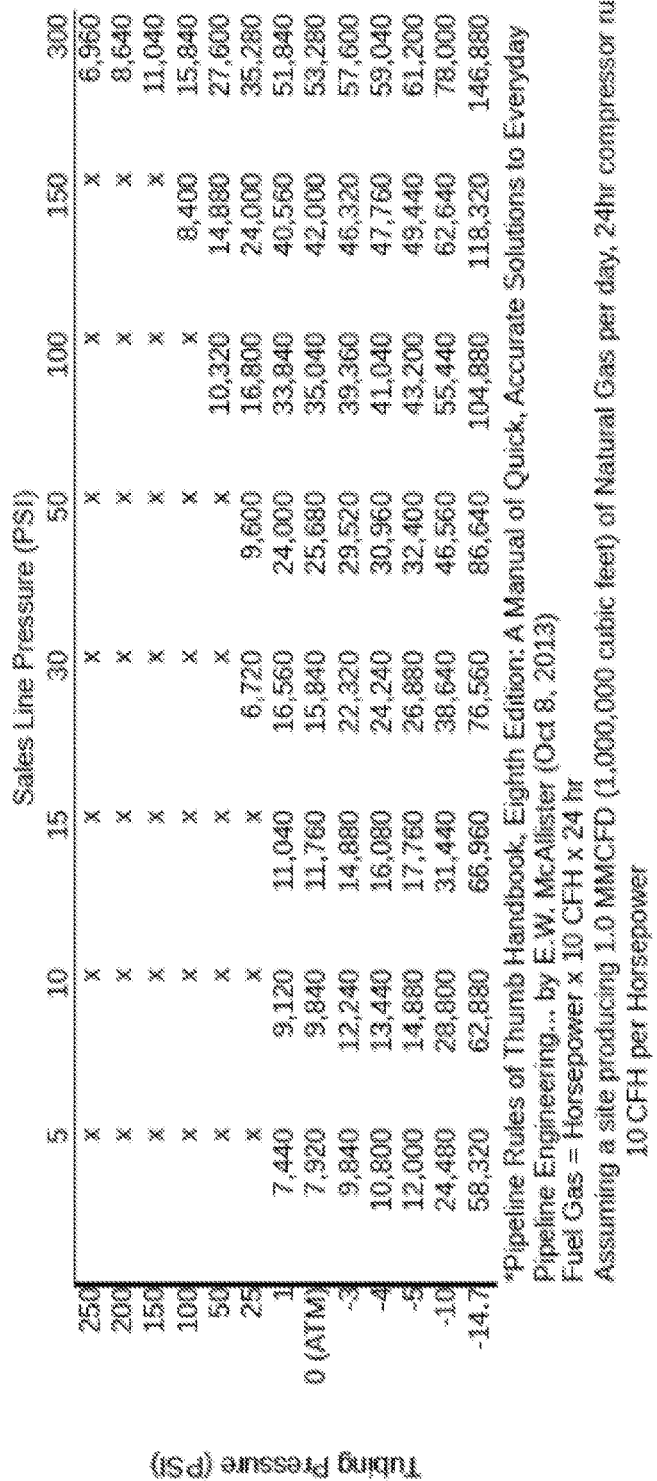
FIG. 15 includes Table 5 and provides fuel gas consumption regarding vapor recovery and/or sales compressor.

FIGS. 9A-C depict flow diagrams for embodiments of a control system algorithm for Modes 1-3, respectively, of the oil and condensate processing system.

Generally, the control system for each of embodiments A-D provide adjustable set points to tune at least the three (3) modes of operation: mode 1 vapor recovery (Embodiments A, B, C, D), mode 2 oil production enhancement (Embodiment D), and mode 3 multiple well optimization (Embodiments A, B, C, D). In any mode of operation, a user or operator may engage the control system thru a display and/or a screen and/or a computer. Also, in any mode of operation the control algorithm may incorporate a mathematical function such as a proportional integral derivative (PID) feedback loop, or other control system algorithms or techniques know to those skilled in the art, to include stochastic control, adaptive control, etc.

FIG. 9A depicts the control system algorithm for mode 1. When Embodiments A, B, C, D are operating in mode 1 (vapor recovery mode) the critical set points comprise vapor recovery efficiency (95-99%), barrels of oil production per day (bbl/day), and a menu choice of desired flash vapor compounds (natural gas, propane, butane, pentane etc.) to capture. The Mode 1 control system algorithm will determine the optimal distillation column pressure to capture flash vapor at the desired vapor recovery efficiency and capture the desired flash vapor compounds. As a fail-safe, the algorithm may warn the operator if the choice of flash vapor compound will cause the vapor recovery efficiency to drop below 95% capture and may advise the operator to, for example, choose the next heavier flash vapor compound to capture. Capturing heavier flash vapor compounds will reduce the potential flash vapor emissions when the oil and condensate goes to the tanks. This is important since the EPA requires oil production sites to maintain minimum of 95% vapor recovery or combustion of flash vapors from storage tanks. However, improving efficiency of capture increases the use of horse power so a balance of vapor recovery efficiency and horse power use is desired to maximize economic return from capturing flash gas. After the set points are entered, the control system varies the distillation column pressure and flow of oil and condensate to maintain the vapor recovery efficiency set point and desired flash vapor compound set point.

FIG. 9B depicts the control system algorithm fir mode 2. To operate in mode 2, mode 1 must be enabled. When Embodiments A, B, C, D are operating in mode 2 (oil well production enhancement) a critical set point is the ratio of well casing to well tubing pressure (determined by operational tuning at each well). The initial well casing to well tubing ratio is based on operational tuning. The control system algorithm for mode 2 monitors the pressure of the well casing and pressure of the well tubing and opens or closes control valve (choke valve) 6 or 8 to vary the well tubing pressure to match the entered set point for well tubing pressure (varies from sales line pressure to ATM to −14 psi). The control algorithm may incorporate a mathematical function such as a proportional integral derivative (PID) feedback loop (or other control system algorithms or techniques know to those skilled in the art, to include stochastic control, adaptive control, etc.) to maintain the optimal open or closed position of control valve (choke valve) 6 or 8 so that the well tubing pressure set point is maintained. The control algorithm continuously monitors the casing pressure then calculates and compares the measured well casing to well tubing pressure ratio to the entered set point (selected or entered by the operator). The PID control loop actuates control (choke) valve 6 or 8 to adjust the well tube pressure to maintain the set point value.

In mode three (3) of FIG. 9C, the system monitors multiple wells and processes oil and gas from one well at a time in a sequential order. Here, mode 1 and/or mode 2 must be enabled, and a well plunger lift timer cycle set point entered for each well (time for a plunger to fall to the bottom of the well then return to the surface). The well casing pressure and well tubing pressure is monitored at each well as in mode 2. The algorithm for mode 3 may also monitor the typical plunger lift cycle time for each well, then calculate the sequential order in which the wells operate. In this mode 3, only one well at a time may flow oil and gas to the distillation unit at any one time. However, the well plunger lift cycles may overlap but only the rule applies that one well at a time is allowed to flow oil and gas to the distillation unit at a time. However, there is an exception such that more than one well can flow oil gas to the distillation column when multiple well flow control function is enabled by the operator. When multiple well flow is enabled, more than one well may flow oil and gas to the distillation unit as a combined flow.

For example, if the site has three wells (X, Y, and Z) and each well has a plunger lift cycle of one hour then the algorithm will operate one plunger lift cycle for well X, then operate one plunger lift cycle for well Y, then one plunger lift cycle for well Z. The total time to run one plunger lift cycle for all three wells in sequence is three hours. Over twenty four hours each well will operate eight times (eight plunger lift cycles per well).

In another example, well X has a plunger lift cycle of two hours where the first hour of the cycle well X is building casing pressure to reach the entered casing to tubing ratio set point. Well Y and well Z have plunger lift cycles of one hour. The control algorithm will operate a plunger lift cycle for well Y which is one hour while well X is building casing pressure. After well Y plunger lift cycle is complete the control algorithm allows well X to flow oil and gas to the distillation column during the second hour of the respective plunger lift cycle. After well X plunger lift cycle is complete, the control algorithm operates well Z plunger lift cycle for one hour. In this example, the well run times have been optimized such that each well still completes eight plunger lift cycles in a twenty four hour period. This had been accomplished by allowing well X and well Y to overlap their well plunger lift cycle times.

In yet another example, consider two wells (X, and Y). Well X has a plunger lift cycle of two hours, the first hour building pressure in the well casing and the second hour flowing oil and gas to the surface. Well Y has a plunger lift cycle of one hour. The control algorithm begins well X plunger lift cycle and well Y plunger lift cycle at the same time. Y completes its plunger lift cycle in one hour then the control system allows well X to flow oil and gas to the distillation unit. The sequence repeats throughout the day. In this example, both wells completes 12 plunger lift cycles per day.

Generally, the system for oil and condensate processing provides unexpected results and benefits. In one initial embodiment, a Vapor Recovery Unit that captures greater than 95% of specified flash vapor containing (natural gas, propane, butane, and natural gasolines) from oil and condensate was developed. This result was accomplished by processing oil and condensate at low pressures down to atmospheric pressure (ATM) to a vacuum of −14 psi within a distillation column. See FIG. 2A. It is possible to estimate the low pressure set point that will maximize the flash vapor recovery and/or choose the heaviest hydrocarbons desired to capture. For example, the lower the pressure in the distillation column, the heavier the hydrocarbon chains that can be captured as a flash vapor. The captured flash vapor energy (BTU content) will increase when heavier hydrocarbon gasses are captured making a higher value gas product to sales pipelines. As a general rule, natural gasolines (octanes $C_8H_{18}$) are about the heaviest hydrocarbon desired to capture because these hydrocarbons are typically a liquid at sales pipeline pressures and are difficult to measure at gas custody meters. The sales stream should be in a gas state to accurately and precisely measure gas flow and gas quality for sales to pipelines.

One unexpected benefit of low pressure vapor recovery and distillation, as disclosed, is that the system can be used to lower the pressure of the well head (to include the well tubing to the bottom of the well) to pressures lower than the sales line. The system can vary the well tubing pressure from sales line pressure (approx. 300 psi) in this example to atmospheric pressure (ATM) and even down to a maximum vacuum of −14 psi. This reveals that the vapor recovery system has a novel benefit to increase oil production by lowering the well head pressure, thereby assisting existing technologies such as plunger lift systems. One way to describe this effect is that a plunger lifting oil and condensate to the surface must fight the resistance of sales line pressure, if the resistance is removed by lowering the pressure in the well tubing the plunger can push oil and condensate up the tubing faster. This can be accomplished in addition to the initial embodiment which served to, among other things, capture specified flash vapor compounds from the oil and condensate stream from the 3 phase separator.

To extend and leverage the initial embodiment, the system, in other embodiments, operates in 3 different modes of operation: Mode (1) vapor recovery at low pressure or a vacuum; mode (2) oil well production enhancement at low pressure or a vacuum; and mode (3) as a multiple well oil production enhancement tool. Embodiments A, B, C, D can operate in mode 1, Embodiment D, can operate in mode 2, and Embodiments A, B, C, D can operate in mode 3.

As an example, in one embodiment, the system may be placed on a new well site just after drill completion and may operate in mode (1) as a vapor recovery system, then as the well ages and oil and gas flows decrease, the system may operate in mode (2) as a oil production aid at a low pressure or a vacuum while still performing the benefit of vapor recovery of mode (1). If the system is placed on a site with multiple wells, it can operate in mode (3) where he system is used the system can be used to enhance oil production and optimize the production of multiple wells at a site while performing the benefits of mode (1) vapor recovery and oil production enhancement mode (2). In mode (3), the system monitors each well head and processes oil and gas from one well at a time in a sequential order.

In a further application, the system is placed on an exiting well that is aging. The system will operate in mode 2, enhancing oil production with the normal gains of mode 1 vapor recovery. In another application the system may be placed on a well and operate only in mode 1 only (Embodiment A, B, C). In another application, the system may be placed on a site with multiple wells and operate in mode 1 (vapor recovery) and mode 3 (multiple well optimization). In another application the system may be placed on a site with just one well and operate in mode 1, and mode 2. In another application the system may be applied to a site and operate in junction with the 3 phase separator in mode 1, mode 2, and mode 3 or in mode 1 and mode 2 only. In another application the system may operate in tandem with another like system in any of the modes described herein. In another application the system may work with in tandem or assist other oil well production systems such as pump jacks, gas lift systems, downhole compression systems, vapor recovery systems, and combustion flares. It is assumed combustion flares will be on all sites due to state and federal regulations requiring combustion flares and back up equipment if vapor recovery systems suffer mechanical failures.

In one embodiment, a control or choke valve is disposed or operates after or downstream of the well head. In one embodiment, the distillation column operates between (inclusive) about ATM to −14 psi. In one embodiment, any or all oil pumps is any mode of transferring oil to storage tanks or receiving device or entity. In one embodiment, any or ail water pumps may be any mode of transferring water to the storage tanks or the receiving device or entity. In one embodiment, a manifold for pneumatic gas is employed which allows the capture of gas vented from pneumatic vales onsite. In one embodiment, the Vapor Recovery Unit controls pressure within the distillation column.

Although much of this disclosure references oil and condensate processing with respect to oil and gas production sites, the systems and method may be applied in other applications, to include any application where recovery of gas vapors is of interest.

As will be appreciated, it would be possible to provide for some features of the inventions without providing others.

Design and Performance Data

Any oil and natural gas production site with the potential to emit more than 6 tons of volatile organic compounds (VOC's) per year must meet the 2012 EPA New Source Performance Standards. If an oil storage tank's potential emissions are 6 or more tons of VOCs per year, the owner/operator has to control VOC emissions by Apr. 15, 2015. Storage tanks with potential emissions of 6 or more tons per year must reduce total VOC's by 95%.

The above identified design values of the described invention ensure potential emissions are reduced below 6 tons per year or 95% VOC capture at a minimum and have an optimal range of 0-6 tons per year lost, or 95% to 99.9% total VOC capture as standardized by the EPA. Conventional vapor recovery technology in use on normal sites, as well as the Ward patent that has been referenced cannot meet the new EPA standards.

Using the Vasquez Beggs equation gives an optimal set point range for pressure in the distillation column of this design. The exact distillation column pressure varies with external factors including oil viscosity, oil temperature, altitude, and equipment selection, for example. For example, embodiment C (FIG. 4C) only slightly increases the vapor capture over embodiments A and B (i.e. FIGS. 4A and 4B, respectively). A benefit of embodiment C may include reduced design costs; e.g. heating the oil may allow for a smaller distillation column for example, and therefore a more affordable design. Furthermore, a temperature of 250 F has been chosen for simulation and modeling to ensure the management of natural gas vapor temperature.

FIG. 8 provides details regarding volatile organic compound emission calculations as used to generate data contained in Tables 1-3. Table 1 of FIG. 10 provides reduction of volatile organic compounds (VOC) flash below 6 tons per year (TPY). Table 2 of FIG. 11 provides reduction of VOC flash by 95%. Table 3 of FIG. 13 provides capture gain over the cited prior art of Ward.

For Embodiment A

In Colorado, a typical oil production site producing an average of 1,000 bbl/day the operating range for pressure in the distillation column is modeled to be between about −6.1 psi to −10.4 psi with an optimal set point of approximately −9.1 psi to reduce potential VOC emissions to less than 6 tons per year, 2.8 tons per year at the optimal set point, and less than 1 ton per year at the maximum vacuum. Alternatively, operating range for pressure in the distillation column is modeled to be between ATM to −3.6 psi with an optimal set point of −1.8 psi to reduce potential VOC emissions to the minimum of 95% potential VOC emissions per year in the 1,000 bbl/day scenario.

For Embodiment B

The optimal distillation pressure is determined by the Vasquez Beggs equation by increasing the oil temperature by an available process waste heat source with only minimal gains in vapor capture.

For Embodiment C

In Colorado, a typical oil production site producing an average of 1,000 bbl/day the Embodiment C operating range for pressure in the distillation column is modeled to be between about −2.8 psig to −8.4 psig and at 250 dg F. with an optimal set point of −5.5 psi.

These ranges reduce potential VOC emissions to less than 6 tons per year. Alternatively, the operating range for pressure in the distillation column is modeled to be ATM at 250 dg F. to reduce potential VOC emissions to well below the minimum of 95% potential VOC emissions per year.

For Embodiment D

The following example engineering analysis describes the horsepower requirements for the oil and gas processing unit (distillation unit), and the increase in oil accumulation due to reducing the vapor pressure above a column of oil in a well tube. The discussion in the result section is based on a 100 bbl/day site producing 1,000,000 cubic ft of gas.

Plunger Lift Operation

A natural gas well consists of a cement lined (casing) created by drilling into rock to the depth of rock containing oil, condensate, and natural gas. Within the casing is a pipe (tubing) running from the well head at the surface to the bottom of the well. Many of these wells produce oil and condensate via a plunger lift system which operates by dropping a plunger to the bottom of the natural gas well. As the plunger falls to the bottom of the well oil and condensate accumulates within the well tubing. Over time, gas pressure builds in the casing from gasses liberated within the geologic formation providing the pressure (force) to push the plunger and the oil and condensate to the surface where the gas goes to a sales line and oil and condensate goes to their respective storage tanks.

Ratio of Casing Pressure to Tubing Pressure

Gas pressure in the tubing is typically the same as the sales line pressure which may be 300 psi for example. To operate the plunger lift the casing pressure must be greater than the tubing pressure of 300 psi to push the oil to the surface. This is called the ratio of casing pressure to tubing pressure. Every natural gas well has an optimal ratio of casing to tubing pressure that is tuned during the life of the well to maximize oil and condensate production. The time to reach the optimal ratio of casing to tubing pressure also varies according to well characteristics such as depth, oil quality, gas quantity, surface equipment operating pressures, and sales line pressure.

Increasing Plunger Lift Frequency

In embodiment D (FIG. 2B) the operating pressures of the surface equipment and well tubing pressure may be varied from sales line pressure (300 psi) to low pressure, atmospheric pressure (ATM) or to a vacuum (−14 psi). In this particular embodiment the tubing pressure may be reduced to ATM while the plunger is falling or after it has reached the bottom of the well tubing. This reduction of tubing pressure from 300 psi to ATM reduces the time to build the optimal ratio of casing to tubing pressure because the casing pressure does need to build up to 300 psi to equal with the tubing pressure. Instead, the casing pressure immediately increases above ATM tubing pressure and towards the optimal ratio of casing to tubing pressure. The result is the length of time the plunger sits at the bottom of the well is reduced. The less time the plunger sits at the bottom of the well tubing the more trips it can makes to the surface. Thus the overall frequency of plunger lift in ascents per day increases and oil and condensate production increases. The increase of plunger lift frequency is dependent on characteristics such as: well depth, surface site equipment, oil production, gas production, well age, and operational tuning Increasing Oil Column Head The gas pressure above a column of oil and condensate in well tubing is typically at sales line pressure. Tubing gas pressure may be 300 psi for example. In particular embodiment D (FIG. 2B) the well tubing pressure may be reduced from 300 psi to low pressure, atmospheric pressure (ATM), or to a vacuum (−14 psi). Under low pressure conditions, the plunger may naturally begin to rise pushing oil to the surface because the pressure above the oil column was holding the system in equilibrium. However, if the pressure in the tubing is reduced in a controlled manor oil and condensate will gradually collect above the plunger and the weight of the oil and condensate (oil column head) will maintain the equilibrium of the system and the plunger will not travel to the surface. Over time, gas pressure in the casing will continue increase and the ratio of casing to tubing pressure will increase until the point that the plunger will travel to the surface. In this model, the plunger will carry an increased weight of oil proportional to the decrease in tubing pressure. Based on the engineering estimate in Table 10 (FIG. 19), a tubing pressure of 300 psi is approximately equivalent to 2.7 barrels (42 gallons) of oil in a well tube of 2 inches diameter. If a plunger lift system travels to the surface ten times per day then gross oil and condensate production may increase by approximately 27 barrels per day, Table 10. Due to inefficiencies in site equipment, oil production, gas production, well age, and plunger lift cycle frequency, a 30% efficiency factor has been applied to the increase of oil production by embodiment D (FIG. 2B). After applying the efficiency factor, the estimated gross increase in oil production yields approximately 8 barrels per day, Table 10. Based on engineering estimate in Table 9 (FIG. 18), embodiment D (FIG. 2B) may require fuel gas energy equivalent up to 4.3 barrels of oil per day. After subtracting the energy requirement to operate the compression and pumping systems the estimated net gain in production of oil and condensate is 4 barrels per day or a 4% increase in oil production over typical plunger lift operation. On a well site producing 100 barrels of oil per day the net increase of oil production annually is about 1,460 barrels of oil or approximately $97,820 of additional revenue per year using May 16, 2015 crude oil pricing.

Benefit of Aiding Well Unloading

An additional benefit of particular embodiment D (FIG. 2B) is in the aid of the operational practice of well unloading. Under certain conditions the ratio of casing to tubing pressure becomes unbalanced such that the well has become unproductive, this is known as a loaded well. To resolve the problem of a loaded well the well tubing is opened directly into the oil storage tanks by bypassing the surface equipment such as the separator, and all natural gas and oil and condensate in the well tubing is unloaded into the storage tanks where the natural gas is simply vented to the atmosphere or burned at the combustion flare. This practice reduces "unloads" the pressure in the well tubing to the low pressure conditions of the storage tanks (ATM). After unloading the well tubing the plunger lift system is set back into normal operation where the plunger falls to the bottom of the well tubing and pressure builds in the casing to the optimal ratio of casing to tubing pressure. This procedure of unloading the well tubing releases excessive amounts of greenhouse gasses and carcinogens to the atmosphere and wastes an otherwise sales-quality gas stream. In particular, in embodiment D (FIG. 2B), the well tubing pressure is varied to optimize the ratio of casing to tubing pressure thereby eliminating the need to unload the well tubing to the storage tanks. In the event of an upset or unbalanced casing to tubing ratio the system of embodiment D (FIG. 2B) will reduce the tubing pressure to low pressure conditions to unload the well tubing, but in this case the system will capture all the natural gas from the well tubing and send it to the sales pipeline as well as process the oil to remove flash vapor prior to transferring the oil to the storage tanks. This benefit eliminates venting of sales quality natural gas (greenhouse gasses and carcinogens) to the atmosphere, and increases safety at the well site.

What is claimed is:

1. A system for processing a produced hydrocarbon fluid from a wellbore at an on-site production system to reduce flaring, the hydrocarbon fluid including oil, natural gas and water, comprising:
    a separator to separate the oil, natural gas and water at a first pressure;
    a distillation unit configured to receive the oil downstream from the separator and reduce the pressure below atmospheric pressure, the distillation unit configured to separate natural gas from the oil;
    a first conduit to transfer oil from the distillation unit to an oil storage tank; and
    a vapor recovery unit downstream from the distillation unit to receive the separated natural gas.

2. The system of claim 1, wherein the first pressure in the separator is controlled by a valve positioned between the separator and the distillation unit.

3. The system of claim 1, wherein the distillation unit operates between 0 psig and −14 psig.

4. The system of claim 1, wherein the pressure in the distillation unit is controlled by a valve positioned downstream from the distillation unit.

5. The system of claim 1, further comprising providing the natural gas to at least one of an inlet to a compressor and a natural gas pipeline.

6. The system of claim 1, wherein the oil in the oil storage tank comprises less than about 5% entrained natural gas.

7. The system of claim 1, wherein flashing of light end hydrocarbons can be controlled based on at least one of the pressure of the distillation unit and the first pressure of the separator.

8. The system of claim 1, further comprising:
    a second conduit to transfer the separated natural gas from the distillation unit to the vapor recovery unit.

9. The system of claim 1, wherein the vapor recovery unit creates a vacuum which is applied to the distillation unit.

10. The system of claim 1, wherein a compressor downstream from the distillation unit creates a vacuum applied to the distillation unit.

11. The system of claim 1, further comprising a heat exchanger to provide heat energy to the oil upstream from the distillation unit.

12. The system of claim 1, wherein the pressure of the distillation unit is determined based on a hydrocarbon constituency of natural gas to be captured.

13. The system of claim 12, wherein the hydrocarbon constituency of natural gas to be captured comprises at least one of methane, ethane, propane, butane, pentane, hexane, heptane, and octane.

14. A method of processing a produced hydrocarbon fluid including oil, water, and natural gas from a well head at an on-site production facility to reduce flaring, comprising:
    receiving the hydrocarbon fluid comprising oil, water, and natural gas from the well head at a first pressure;
    separating the oil, natural gas, and water in a three-phase separator;
    receiving the oil in a distillation unit downstream from the separator;
    reducing the pressure below atmospheric pressure in the distillation unit, wherein the distillation unit is configured to separate natural gas from the oil;
    transferring oil from the distillation unit to an oil storage tank by a first conduit; and
    receiving the separated natural gas in a vapor recovery unit located downstream from the distillation unit.

15. The method of claim 14, wherein the distillation unit operates between 0 psig and −14 psig.

16. The method of claim 14, wherein the vapor recovery unit receives the separated natural gas from the distillation unit by a second conduit.

17. The method of claim 14, further comprising scrubbing the natural gas to remove excess liquids.

18. The method of claim 14, wherein the oil in the oil storage tank comprises less than about 5% entrained natural gas.

19. A method of processing a produced hydrocarbon fluid comprising natural gas, water and an oil/condensate mixture from a wellbore at an on-site production facility to reduce flaring, comprising:
- receiving the hydrocarbon fluid at a first pressure;
- separating the water, natural gas and oil with a three phase separator;
- receiving the oil in a distillation unit positioned downstream from the three phase separator;
- reducing the pressure of the oil in the distillation unit below atmospheric pressure;
- separating natural gas from the oil within the distillation unit;
- transferring oil from the distillation unit to an oil storage tank by a first conduit; and
- receiving the separated natural gas in a vapor recovery unit positioned downstream from the distillation unit.

20. The method of claim 19, further comprising providing the natural gas to at least one of a sales line compressor and a natural gas pipeline.

* * * * *